(12) United States Patent
Drazic et al.

(10) Patent No.: US 12,449,583 B2
(45) Date of Patent: Oct. 21, 2025

(54) LOW DISTORTION IMAGING THROUGH A C-SHAPE FLAT OPTICAL ARCHITECTURE

(71) Applicant: InterDigital CE Patent Holdings, SAS, Paris (FR)

(72) Inventors: Valter Drazic, Betton (FR); Oksana Shramkova, Liffré (FR)

(73) Assignee: InterDigital CE Patent Holdings, SAS, Paris (FR)

(*) Notice: Subject to any disclaimer, the term of this patent is extended or adjusted under 35 U.S.C. 154(b) by 270 days.

(21) Appl. No.: 18/020,770

(22) PCT Filed: Aug. 10, 2021

(86) PCT No.: PCT/EP2021/072246
§ 371 (c)(1),
(2) Date: Feb. 10, 2023

(87) PCT Pub. No.: WO2022/034060
PCT Pub. Date: Feb. 17, 2022

(65) Prior Publication Data
US 2023/0324595 A1    Oct. 12, 2023

(30) Foreign Application Priority Data

Aug. 13, 2020 (EP) .................................. 20305928

(51) Int. Cl.
*F21V 8/00* (2006.01)
*G02B 27/01* (2006.01)

(52) U.S. Cl.
CPC ......... *G02B 6/0036* (2013.01); *G02B 6/0016* (2013.01); *G02B 6/0076* (2013.01);
(Continued)

(58) Field of Classification Search
None
See application file for complete search history.

(56) References Cited

U.S. PATENT DOCUMENTS

| 10,393,930 B2 * | 8/2019 | Tervo | G02B 5/18 |
| 2014/0168260 A1 * | 6/2014 | O'Brien | G09G 5/377 |
| | | | 385/134 |

(Continued)

FOREIGN PATENT DOCUMENTS

| CN | 110582716 A | 12/2019 |
| CN | 111240015 A | 6/2020 |

(Continued)

OTHER PUBLICATIONS

Kress, B. C. "Optical waveguide combiners for AR headsets: features and limitations." Digital Optical Technologies 2019, vol. 11062, p. 110620J. International Society for Optics and Photonics, 2019 (26 pages).

(Continued)

*Primary Examiner* — Jerry Rahll
(74) *Attorney, Agent, or Firm* — Klintworth & Rozenblat LLP

(57) ABSTRACT

Embodiments include an optical system that may be included in a waveguide display. A waveguide apparatus according to some embodiments includes an in-coupler grating having a first grating vector $G_1$ substantially perpendicular to a first axis, x; a first eye pupil expander grating having a second grating vector $G_2$ and a first angle $\Phi_G$ with respect to the first axis; a second eye pupil expander grating having a third grating vector $G_3$ and an angle substantially equal to $90°+\Phi_G$ with respect to the first axis; and an out-coupler grating having a fourth grating vector $G_4$ substantially perpendicular to the first axis. Example embodiments describe relationships among the grating vectors, the angle $\Phi_G$, and associated parameters to achieve a satisfactory field of view while reducing distortion.

19 Claims, 18 Drawing Sheets

(52) U.S. Cl.
CPC .. *G02B 27/0172* (2013.01); *G02B 2027/0123* (2013.01); *G02B 2027/0132* (2013.01)

(56) References Cited

U.S. PATENT DOCUMENTS

| | | | |
|---|---|---|---|
| 2017/0315346 A1* | 11/2017 | Tervo | G02B 5/1819 |
| 2018/0052501 A1* | 2/2018 | Jones, Jr. | G02B 6/0035 |
| 2018/0113313 A1* | 4/2018 | Tekolste | G02B 27/0081 |
| 2018/0203230 A1* | 7/2018 | Vallius | G02B 27/0172 |
| 2019/0004219 A1 | 1/2019 | Tervo | |
| 2019/0107723 A1 | 4/2019 | Lee | |
| 2019/0187474 A1 | 6/2019 | Bhargava | |
| 2020/0225491 A1* | 7/2020 | Tekolste | G02B 5/1861 |
| 2020/0379158 A1* | 12/2020 | Blomstedt | G02B 27/0172 |
| 2021/0109347 A1* | 4/2021 | Blomstedt | G02B 27/0081 |
| 2023/0097201 A1 | 3/2023 | Drazic | |
| 2023/0134576 A1 | 5/2023 | Oksana | |

FOREIGN PATENT DOCUMENTS

| | | |
|---|---|---|
| EP | 3671293 A1 | 6/2020 |
| WO | 2017180403 | 10/2017 |
| WO | 2019122529 A1 | 6/2019 |
| WO | 2019185977 A1 | 10/2019 |
| WO | 2021053182 | 3/2021 |
| WO | 2021204656 A1 | 10/2021 |

OTHER PUBLICATIONS

Rolland, J. et al., "Head-Mounted Display Systems." Encyclopedia Of Optical Engineering, 2005 pp. 1-14 (14 pages).

Rolland, J. et al., "Head-worn displays: the future through new eyes." Optics and Photonics News, Apr. 2009, pp. 20-27 (8 pages).

Wikipedia "Optical head-mounted display" retrieved from https://en.wikipedia.org/wiki/Optical_head-mounted_display last accessed Aug. 11, 2023 (6 pages).

Cakmakci, O. et al., "Head-worn displays: a review." Journal of display technology vol. 2, No. Sep. 3, 2006, pp. 199-216 (18 pages).

Levola, T., "Diffractive optics for virtual reality displays." Journal of the Society for Information Display 14, No. 5, 2006 pp. 467-475 (9 pages).

Levola, T. et al., "Replicated slanted gratings with a high refractive index material for in and outcoupling of light." Optics Express 15, No. 5, 2007, pp. 2067-2074 (8 pages).

International Search Report and Written Opinion for PCT/EP2021/072246 mailed Nov. 25, 2021 (12 pages).

International Preliminary Report on Patentability for PCT/EP2021/072246 issued Feb. 7, 2021 (8 pages).

\* cited by examiner

LOW DISTORTION IMAGING THROUGH A C-SHAPE FLAT OPTICAL ARCHITECTURE

CROSS-REFERENCE TO RELATED APPLICATIONS

The present application is a national stage application under 35 U.S.C. § 371 of International Application No. PCT/EP2021/072246, entitled "LOW DISTORTION IMAGING THROUGH A C-SHAPE FLAT OPTICAL ARCHITECTURE," filed on Aug. 10, 2021, which claims priority from European Patent Application No. EP20305928.2, filed Aug. 13, 2020, entitled "LOW DISTORTION IMAGING THROUGH A C-SHAPE FLAT OPTICAL ARCHITECTURE", which are hereby incorporated by reference in their entirety.

BACKGROUND

The present disclosure relates to the field of optics and photonics, and more specifically to optical device comprising at least one diffraction grating. It may find applications in the field of conformable and wearable optics (e.g. AR/VR glasses (Augmented Reality/Virtual Reality)), as well as in a variety of other electronic consumer products comprising displays and/or lightweight imaging systems, including head up displays (HUD), as for example in the automotive industry.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

AR/VR glasses are under consideration for a new generation of human-machine interface. Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact optical components that can be used as building blocks for more complex optical systems, such as AR/VR glasses. It is desirable for such optical components to be easy to fabricate and replicate.

In such AR/VR glasses, various types of refractive and diffractive lenses and beam-forming components are used to guide the light from a micro-display or a projector towards the human eye, allowing formation of a virtual image that is superimposed with an image of the physical world seen with a naked eye (in case of AR glasses) or captured by a camera (in case of VR glasses).

Some of kinds of AR/VR glasses utilize an optical waveguide wherein light propagates into the optical waveguide by TIR (for Total Internal Reflection) only over a limited range of internal angles. The FoV (for Field of View) of the waveguide depends on the material of the waveguide, among other factors.

The FoV of a waveguide may be expressed as the maximum span of $\theta_1^+ - \theta_1^-$ which propagates into the waveguide by TIR. In some cases, as illustrated by FIG. 2, the biggest angular span that can be coupled into the waveguide can be expressed by two rays: the critical ray ($\theta_1^C$ in FIG. 2) having incident angle $\theta_1^C$ and the grazing ray ($\theta_1^G$ in FIG. 2) having incident angle $\theta_1^G$. The critical ray is the light ray that just diffracts into the waveguide at the critical angle $\theta_2^C$ defined by sin $$\theta_2^C = \frac{1}{n_2(\lambda)}$$

where $n_2$ is the refractive index of the waveguide's material and $\lambda$ the wavelength of the incident light. Above the critical angle of, total internal reflection (TIR) occurs. The grazing ray is the ray having an input angle that diffracts into the waveguide at grazing incidence, which may be $\theta_2^G = 90°$. The theoretical FoV of a waveguide presented above is for a single mode system where one single diffraction mode is used to carry the image: either +1 or −1 diffraction mode.

FIG. 3 shows a graph for reasonable ranges of $n_2$. For $n_2 = 1.5$ the total field of view for a single mode system is rather limited to $\Delta\theta_1 = 28.96$ degrees. It can be seen that 60 degrees foV is a practical limit for some types of wave guides because it is not generally feasible to use materials of refractive index above 2.0.

The field of view of an optical waveguide can be further extended by taking advantage of a second direction of propagation inside of the waveguide, doubling it.

In WO2017180403, a waveguide with extended Field of View (ultra high FoV) is proposed wherein a dual mode image propagation is used. In this method, they use the diffraction mode +1 to carry one side of the image in one direction and the −1 mode to propagate the other side of the image into the opposite direction into the waveguide. Combining both half images is done using pupil expanders and out-couplers at the exit of the waveguide so that the user sees one single image.

Using diffraction orders higher than one has the effect of multiplying the wavelength by the order which is used in the diffraction equation. As the grating pitch is directly a function of the product $M\lambda$, this means that the grating pitch is multiplied by M. This allows for structures used for the in-coupler to be larger and opens up new possibilities in the fabrication technology. For example, nano-imprinting could be used. Also, fewer lines per mm for the grating density are necessary, providing for a simpler fabrication process since the structures will have an over-wavelength size rather than a sub-wavelength size. Such an optical waveguide using both ±2 diffraction orders provides a FoV of about 60° with a refractive index of 1.5. It is thus possible to get a 60° field of View using a material with refractive index 1.5, instead of 2 in single mode.

However, a 60° foV is still limited with respect to the total human field of view where stereopsis is effective for human vision and which is about 114°.

Architectures using two waveguides for a full RGB combiner have been investigated in which the green FoV is shared between first and second waveguides, as described in B. C. Kress, "Optical waveguide combiners for AR headsets: features and limitation," Proc. of SPIE, vol. 11062, p. 110620J, 2019.

Waveguide-based AR/VR glasses can exhibit a wide field of view along one direction (e.g. in a horizontal direction) but may have a narrower field of view along another direction (e.g. in a vertical direction). However, because AR/VR applications generally call for particular aspect ratios, a limitation of the field of view along one direction may, for practical purposes, effectively limit the field of view along the other direction.

SUMMARY

References in the specification to "one embodiment," "an embodiment," "an example embodiment," and the like indicate that the embodiment described may include a particular feature, structure, or characteristic, but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

In some embodiments, a waveguide apparatus includes: an in-coupler grating configured to use diffraction order $M_1$, the in-coupler grating having a first grating pitch $\Lambda_1$ and a first grating vector $\vec{G}_1$ substantially perpendicular to a first axis, $\hat{x}$; a first eye pupil expander grating configured to use diffraction order $M_2$, the first eye pupil expander having a second grating vector $\vec{G}_2$, a second grating pitch $\Lambda_2$, and a first angle $\Phi_G$ with respect to the first axis; a second eye pupil expander grating configured to use diffraction order $M_3$, the second eye pupil expander having a third grating vector $\vec{G}_3$, a third grating pitch $\Lambda_3$, and an angle between $80°+\Phi_G$ and $100°+\Phi_G$ with respect to the first axis; and an out-coupler grating configured to use diffraction order $M_4$, the out-coupler grating having a fourth grating pitch $\Lambda_4$ and a fourth grating vector $\vec{G}_4$ substantially perpendicular to the first axis. In some embodiments, the third grating pitch $\Lambda_3$ of the second eye pupil expander substantially satisfies:

$$\Lambda_3 = \frac{M_3}{M_2}\Lambda_2 \tan(\Phi_G).$$

In some embodiments, the out-coupler grating is configured to use a first diffractive order, such that $|M_4|=1$, and at least one of the in-coupler gratings and the eye pupil expander gratings is configured to use a second diffractive order.

In some embodiments, the out-coupler grating is configured to use a first diffractive order, such that $|M_4|=1$, and the in-coupler grating and the first and second eye pupil expander gratings are configured to use a second diffractive order, such that $|M_1|=|M_2|=|M_3|=2$.

In some embodiments of the waveguide apparatus, wherein the fourth grating pitch $\Lambda_4$ of the out-coupler substantially satisfies:

$$\frac{M_4}{\Lambda_4} - \frac{M_1}{\Lambda_1} + \frac{M_2}{\Lambda_2 \sin(\Phi_G)} = 0.$$

In some embodiments, the grating pitches $\Lambda_2$ and $\Lambda_3$ substantially satisfy:

$$\Lambda_2 = \Lambda_3 = M\lambda \sin\left(\Phi_G - \frac{\varphi}{2}\right)$$

where $$\varphi = \sin^{-1}\left(1 - \frac{1}{n_2 \sin\theta_2^g}\right).$$

In some embodiments, the grating pitch $\Lambda_1$ substantially satisfies:

$$\Lambda_1 = \frac{M_1 \lambda}{n_2 \sin\theta_1^g - n_1 \sin\theta_0^g}$$

In some embodiments, the grating pitches are within 20% of the following values:
$\Lambda_1$=851.38 nm
$\Lambda_2$=729.46 nm
$\Lambda_3$=729.46 nm
$\Lambda_4$=1308.64 nm.

In some embodiments, the grating pitches are within 10% of the following values:
$\Lambda_1$=851.38 nm
$\Lambda_2$=729.46 nm
$\Lambda_3$=729.46 nm
$\Lambda_4$=1308.64 nm.

In some embodiments, the following relationship is substantially satisfied:

$$\left(\frac{M_2}{\Lambda_2}\right)^2 + \left(\frac{M_3}{\Lambda_3}\right)^2 = \left(\frac{M_1}{\Lambda_1} - \frac{M_4}{\Lambda_4}\right)^2.$$

In some embodiments, the following relationships are substantially satisfied, where $\Phi_K=90°-\Phi_G$:

$$\frac{1}{2}\left(\cos^{-1}\left(\frac{N}{\sqrt{2}}\right) + 45°\right) < \phi_K \leq 90°$$

and $$\Lambda_2 = \frac{M_2 \lambda}{2 \times \cos(\phi_K - \Delta\phi/2)}$$

where $$\Delta\phi = 2\cos^{-1}\left(\sqrt{\frac{(N+1)^2(\tan\phi_K)^2}{(1-N)^2 + (N+1)^2(\tan\phi_K)^2}}\right).$$

In some embodiments, the following relationships are substantially satisfied:

$$\frac{1}{2}\left(\cos^{-1}\left(\frac{N}{2\sin\tan^{-1}N}\right) + \tan^{-1}N\right) < \phi_K \leq \frac{1}{2}\left(\cos^{-1}\left(\frac{N}{\sqrt{2}}\right) + 45°\right)$$

and $$\Lambda_2 = M_2 \lambda \sin(\phi_K - \Delta\phi/2)$$

where $$\Delta\phi = \sin^{-1}(\sin(2\phi_K - N)).$$

In some embodiments, the following relationships are substantially satisfied:

$$\frac{1}{2}\left(\cos^{-1}\left(\frac{N+2-N^2}{2\sqrt{N+1}}\right)+\sin^{-1}\sqrt{\frac{3-N}{4}}\right)<$$

$$\phi_K \leq \frac{1}{2}\left(\cos^{-1}\left(\frac{N}{2\sin\tan^{-1}N}\right)+\tan^{-1}N\right)$$

and $$\Lambda_2 = \frac{NM_2\lambda}{2\times\cos(\phi_K - \Delta\phi/2)}$$

where $$\Delta\phi = 2\tan^{-e}\left[\frac{\cos\phi_K - \sqrt{\Delta}}{2(\alpha + \sin\phi_K)}\right],$$

with $$\alpha = \frac{1-N^2}{8\times\sin\phi_K}$$

and $$\Delta = (\cos\phi_K)^2 - 4\alpha(\alpha + \sin\phi_K).$$

In some embodiments, the following relationships are substantially satisfied:

$$\phi_K \leq \frac{1}{2}\left(\cos^{-1}\left(\frac{N+2-N^2}{2\sqrt{N+1}}\right)+\sin^{-1}\sqrt{\frac{3-N}{4}}\right)$$

and $$\Lambda_2 = \frac{NM_2\lambda}{\cos(\phi_K - \Delta\phi/2) + \sqrt{N^2 - (\sin(\phi_K - \Delta\phi/2))^2}}$$

where $$\Delta\phi = 2\cos^{-1}\left[\frac{\sqrt{1+\cos(2\phi_K)}}{\sqrt{2}\times\cos(2\phi_K)}\right].$$

In some embodiments, a waveguide apparatus further includes an image generator configured to generate an image, the in-coupler grating being configured to couple the image along at least one optical path to the out-coupler grating.

A waveguide apparatus according to some embodiments comprises an in-coupler grating, at least one eye pupil expander grating, and an out-coupler grating, wherein each of the in-coupler grating, the eye pupil expander grating, and the out-coupler grating, has a grating pitch greater than 600 nm.

A waveguide apparatus according to some embodiments comprises an in-coupler grating, at least one eye pupil expander grating, and an out-coupler grating, wherein the out-coupler grating is configured to use a first diffractive order, and at least one of the in-coupler grating and the eye pupil expander grating is configured to use a second diffractive order. In some embodiments, the in-coupler grating and the eye pupil expander gratings are configured to use a second diffractive order.

A method according to some embodiments comprises: coupling light into a waveguide using an in-coupler grating configured to use diffraction order $M_1$, the in-coupler grating having a first grating pitch $\Lambda_1$ and a first grating vector $\vec{G}_1$ substantially perpendicular to a first axis, $\hat{x}$; diffracting the light with a first eye pupil expander grating configured to use diffraction order $M_2$, the first eye pupil expander having a second grating pitch $\Lambda_2$ and second a grating vector $\vec{G}_2$ having a first angle $\Phi_G$ with respect to the first axis; diffracting the light with a second eye pupil expander grating configured to use diffraction order $M_3$, the second eye pupil expander having a third grating pitch $\Lambda_3$ and a third grating vector $\vec{G}_3$ having a second angle of between $80°+\Phi_G$ and $100°+\Phi_G$ with respect to the first axis; and coupling the light out of the waveguide using an out-coupler grating configured to use diffraction order $M_4$, the out-coupler grating having a fourth grating pitch $\Lambda_4$ and a fourth grating vector $\vec{G}_4$ substantially perpendicular to the first axis.

BRIEF DESCRIPTION OF THE DRAWINGS

FIG. 19A illustrates the propagation of one half of a field of view. FIG. 19B illustrates propagation of a single ray.

DETAILED DESCRIPTION

Overview of Example Waveguide Architecture.

Figure 1A:
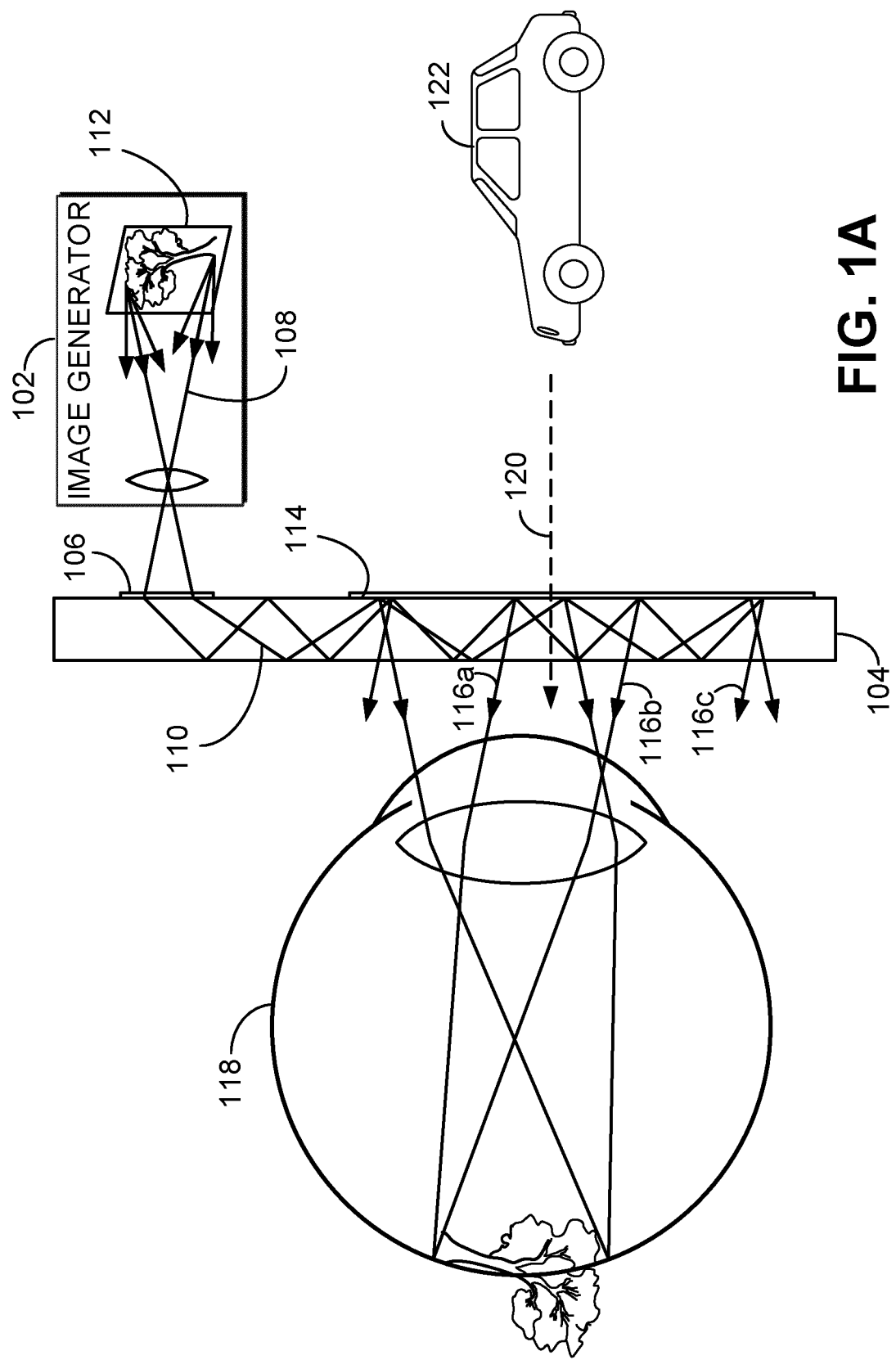
FIG. 1A is a cross-sectional schematic view of a waveguide display.

Described herein are waveguide display systems and methods. An example waveguide display device is illustrated in FIG. 1A. FIG. 1A is a schematic cross-sectional side view of a waveguide display device in operation. An image is projected by an image generator 102. The image generator 102 may use one or more of various techniques for projecting an image. For example, the image generator 102 may be a laser beam scanning (LBS) projector, a liquid crystal display (LCD), a light-emitting diode (LED) display (including an organic LED (OLED) or micro LED (μLED) display), a digital light processor (DLP), a liquid crystal on silicon (LCoS) display, or other type of image generator or light engine.

Light representing an image 112 generated by the image generator 102 is coupled into a waveguide 104 by a diffractive in-coupler 106. The in-coupler 106 diffracts the light representing the image 112 into one or more diffractive orders. For example, light ray 108, which is one of the light rays representing a portion of the bottom of the image, is diffracted by the in-coupler 106, and one of the diffracted orders 110 (e.g. the second order) is at an angle that is capable of being propagated through the waveguide 104 by total internal reflection.

At least a portion of the light 110 that has been coupled into the waveguide 104 by the diffractive in-coupler 106 is coupled out of the waveguide by a diffractive out-coupler 114. At least some of the light coupled out of the waveguide 104 replicates the incident angle of light coupled into the waveguide. For example, in the illustration, out-coupled light rays 116a, 116b, and 116c replicate the angle of the in-coupled light ray 108. Because light exiting the out-coupler replicates the directions of light that entered the in-coupler, the waveguide substantially replicates the original image 112. A user's eye 118 can focus on the replicated image.

In the example of FIG. 1A, the out-coupler 114 out-couples only a portion of the light with each reflection allowing a single input beam (such as beam 108) to generate multiple parallel output beams (such as beams 116a, 116b, and 116c). In this way, at least some of the light originating from each portion of the image is likely to reach the user's eye even if the eye is not perfectly aligned with the center of the out-coupler. For example, if the eye 118 were to move downward, beam 116c may enter the eye even if beams 116a and 116b do not, so the user can still perceive the bottom of the image 112 despite the shift in position. The out-coupler 114 thus operates in part as an exit pupil expander in the vertical direction. The waveguide may also include one or more additional exit pupil expanders (not shown in FIG. 1A) to expand the exit pupil in the horizontal direction.

In some embodiments, the waveguide 104 is at least partly transparent with respect to light originating outside the waveguide display. For example, at least some of the light 120 from real-world objects (such as object 122) traverses the waveguide 104, allowing the user to see the real-world objects while using the waveguide display. As light 120 from real-world objects also goes through the diffraction grating 114, there will be multiple diffraction orders and hence multiple images. To minimize the visibility of multiple images, it is desirable for the diffraction order zero (no deviation by 114) to have a great diffraction efficiency for light 120 and order zero, while higher diffraction orders are lower in energy. Thus, in addition to expanding and out-coupling the virtual image, the out-coupler 114 is preferably configured to let through the zero order of the real image. In such embodiments, images displayed by the waveguide display may appear to be superimposed on the real world.

In some embodiments, as described in further detail below, a waveguide display includes more than one waveguide layer. Each waveguide layer may be configured to preferentially convey light with a particular range of wavelengths and/or incident angles from the image generator to the viewer.

Figure 1B:
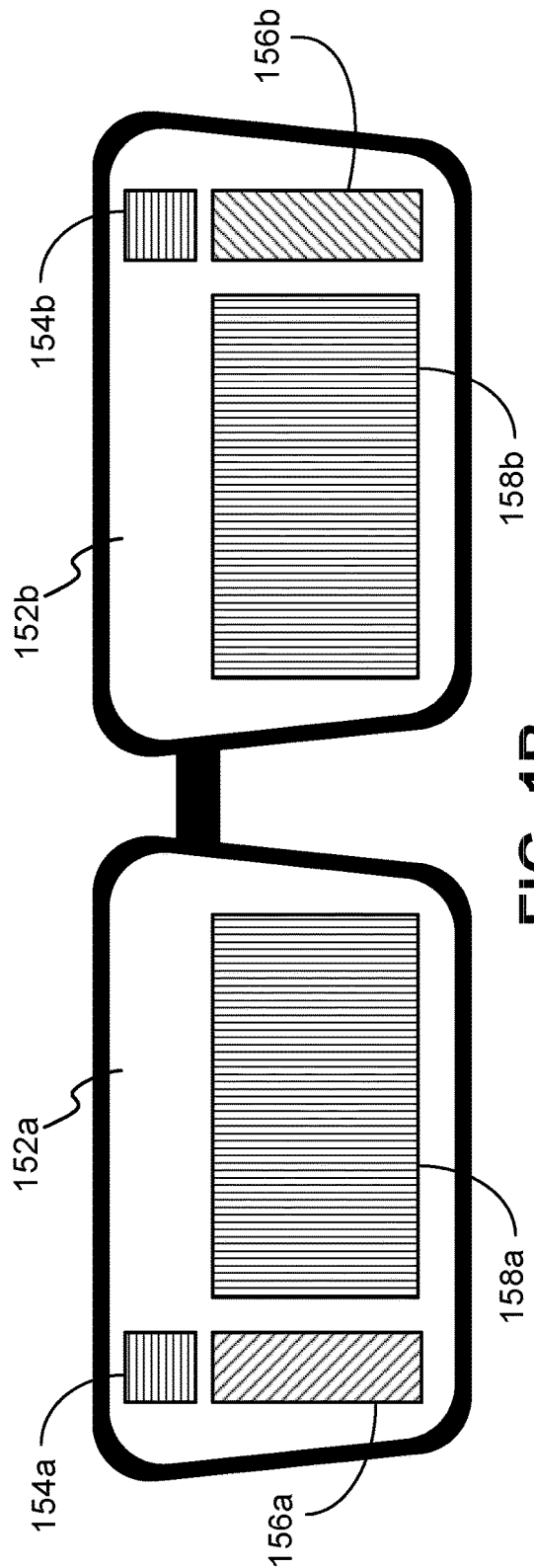
FIG. 1B is a schematic illustration of a binocular waveguide display with a first layout of diffractive optical components.
Figure 1C:
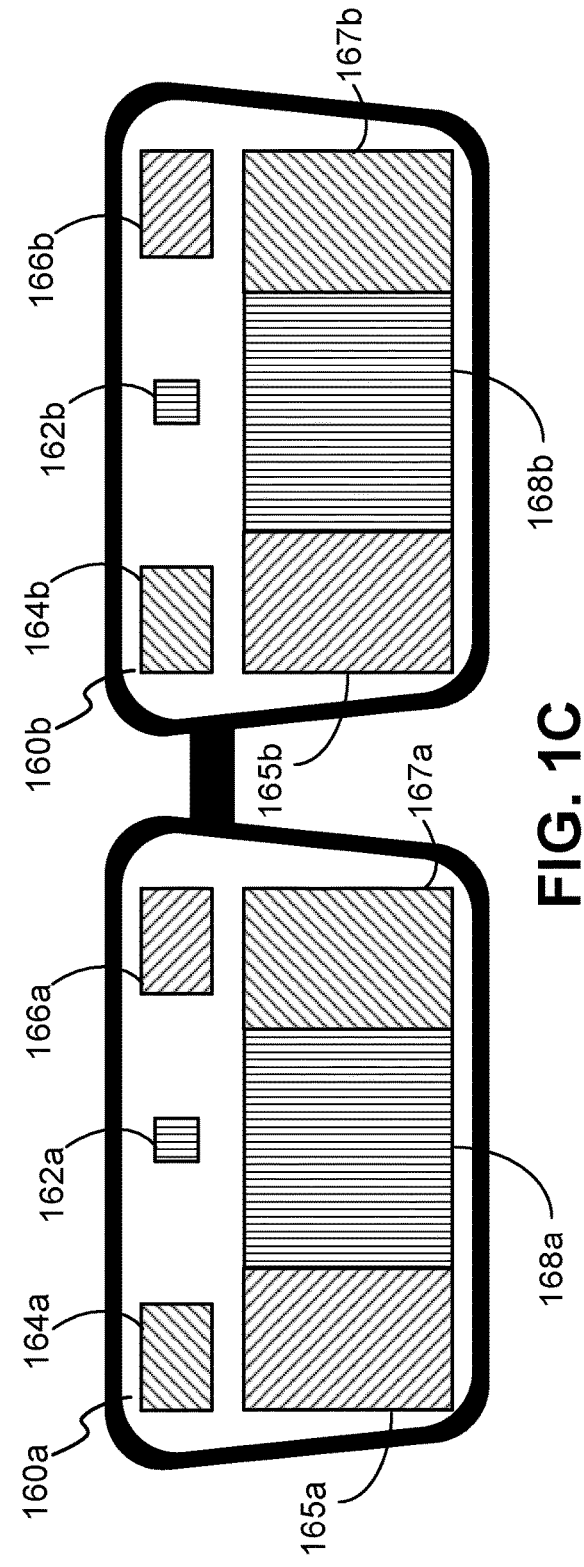
FIG. 1C is a schematic illustration of a binocular waveguide display with a second layout of diffractive optical components.

As illustrated in FIGS. 1B and 1C, waveguide displays having in-couplers, out-couplers, and pupil expanders may have various different configurations. An example layout of one binocular waveguide display is illustrated in FIG. 1B. In the example of FIG. 1B, the display includes waveguides 152a, 152b for the left and right eyes, respectively. The waveguides include in-couplers 154a,b, pupil expanders 156a,b, and components 158a,b, which operate as both out-couplers and horizontal pupil expanders. The pupil expanders 156a,b are arranged along an optical path between the in-coupler and the out-coupler. An image generator (not shown) may be provided for each eye and arranged to project light representing an image on the respective in-coupler.

An example layout of another binocular waveguide display is illustrated in FIG. 1C. In the example of FIG. 1C, the display includes waveguides 160a, 160b for the left and right eyes, respectively. The waveguides include in-couplers 162a,b. Light from different portions of an image may be coupled by the in-couplers 162a,b to different directions within the waveguides. In-coupled light traveling toward the left passes through pupil expanders 164a,b and 165a,b, while in-coupled light traveling toward the right passes through pupil expanders 166a,b and 167a,b. Having passed through the pupil expanders, light is coupled out of the waveguides using out-couplers 168a,b to substantially replicate an image provided at the in-couplers 162a,b.

In different embodiments, different features of the waveguide displays may be provided on different surfaces of the waveguides. For example (as in the configuration of FIG. 1A), the in-coupler and the out-coupler may both be arranged on the anterior surface of the waveguide (away from the user's eye). In other embodiments, the in-coupler and/or the out-coupler may be on a posterior surface of the waveguide (toward the user's eye). The in-coupler and out-coupler may be on opposite surfaces of the waveguide. In some embodiments, one or more of an in-coupler, an out-coupler, and a pupil expander, may be present on both surfaces of the waveguide. The image generator may be arranged toward the anterior surface or toward the posterior surface of the waveguide. The in-coupler is not necessarily on the same side of the waveguide as the image generator. Any pupil expanders in a waveguide may be arranged on the anterior surface, on the posterior surface, or on both surfaces of the waveguide. In displays with more than one waveguide layer, different layers may have different configurations of in-coupler, out-coupler, and pupil expander.

Figure 1E:
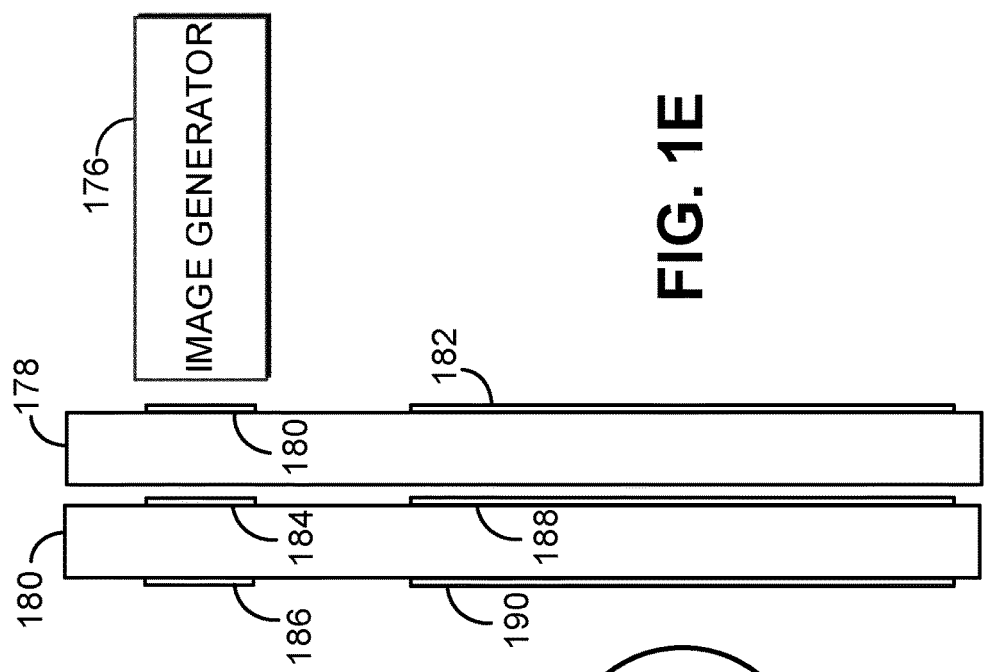
FIG. 1E is a cross-sectional schematic view of a double-waveguide display according to some embodiments.
Figure 1D:
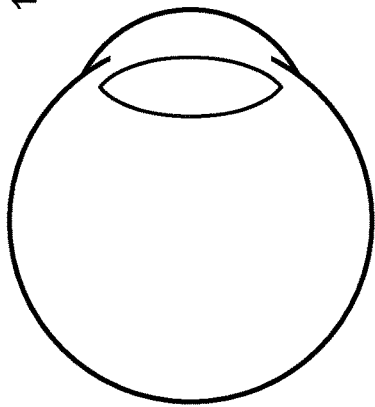
FIG. 1D is a schematic exploded view of a double-waveguide display according to some embodiments.
Figure 1D:
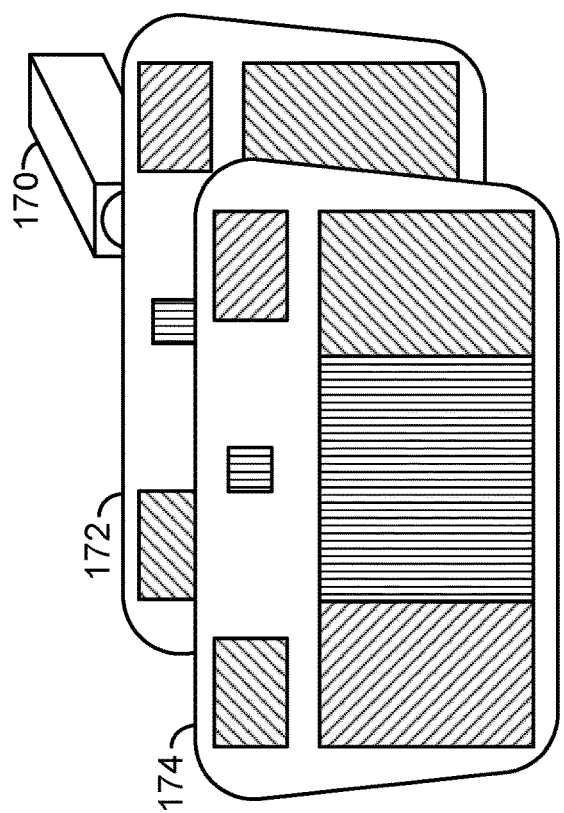
Figure 3:
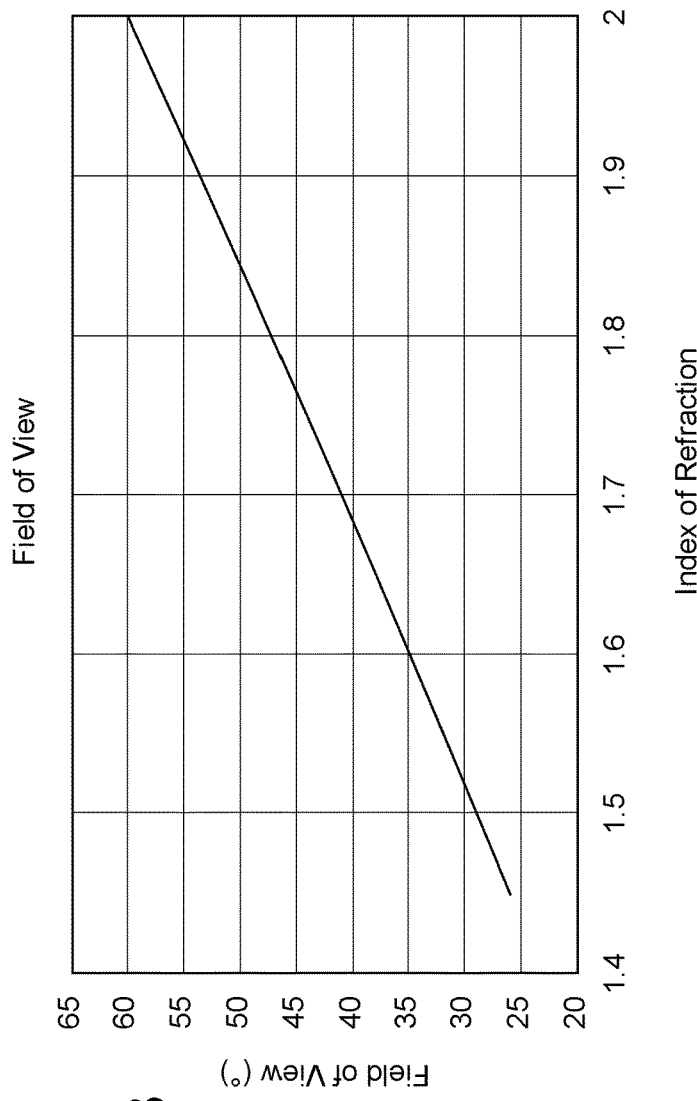
FIG. 3 is an example graph of a wave guide's field of view as a function of the refractive index of its material.
Figure 2:
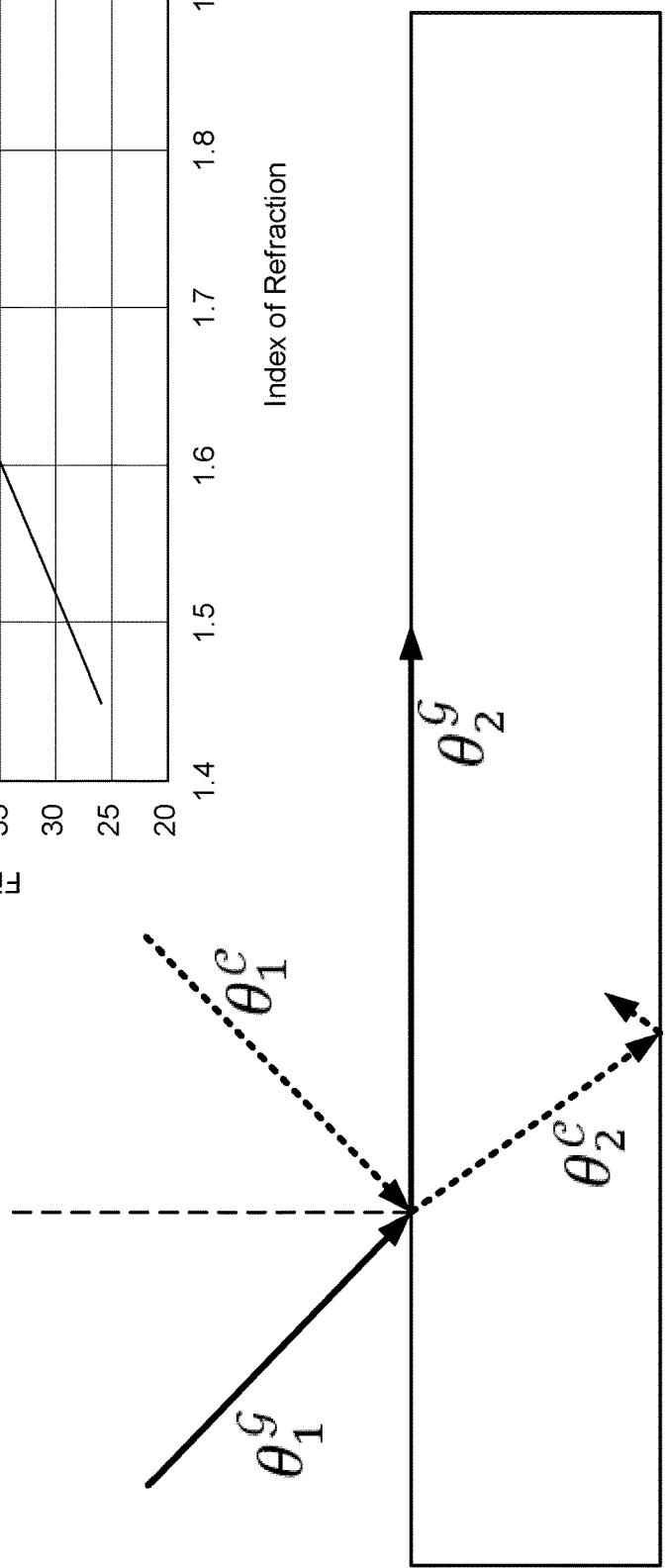
FIG. 2 is a schematic illustration of a single mode system where a single diffraction mode is used to carry the image using either the +1 or the −1 diffraction mode.

FIG. 1D is a schematic exploded view of a double waveguide display according to some embodiments, including an image generator 170, a first waveguide ($WG_1$) 172, and a second waveguide ($WG_2$) 174. FIG. 1E is a schematic side-view of a double waveguide display according to some embodiments, including an image generator 176, a first waveguide ($WG_1$) 178, and a second waveguide ($WG_2$) 180. The first waveguide includes a first transmissive diffractive in-coupler (DG1) 180 and a first diffractive out-coupler (DG6) 182. The second waveguide has a second transmissive diffractive in-coupler (DG2) 184, a reflective diffractive in-coupler (DG3) 186, a second diffractive out-coupler (DG4) 188, and a third diffractive out-coupler (DG5) 190. Different embodiments may use different arrangements of optical components (such as different arrangements of pupil expanders) on the first and second waveguides.

While FIGS. 1A-1E illustrate the use of waveguides in a near-eye display, the same principles may be used in other display technologies, such as head up displays for automotive or other uses.

Overview of Example Coupling Optics.

For waveguides based on diffraction gratings with an optical system generating a synthetic image to be superimposed in the field of view, it is desirable for lens systems to have real and not virtual exit pupils. In other words, its exit pupil location is external to the lens, and it is also at the same time the aperture stop of the lens.

Figure 4:
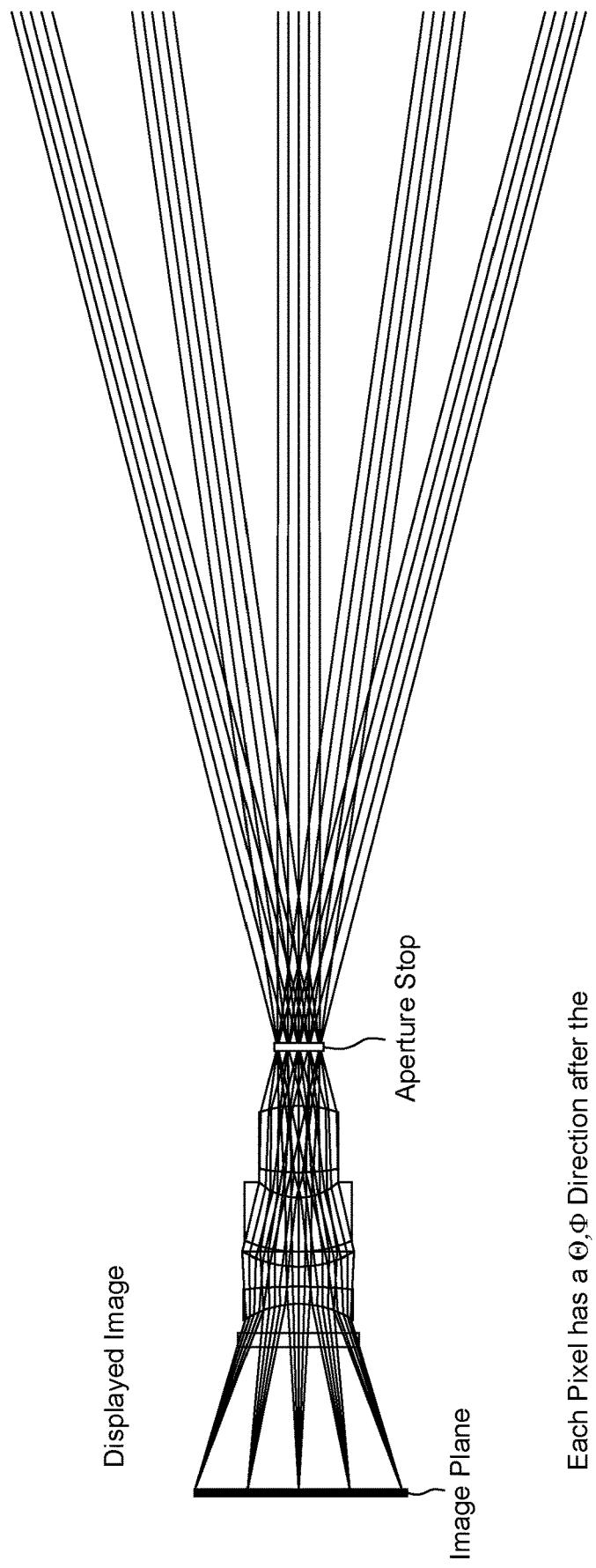
FIG. 4 is a cross-sectional side view of a lens system that provides a real exit pupil.

The lens system of FIG. 4 provides an appropriate exit pupil. The system has a disk-shaped aperture stop whose diameter is dependent on the diameter of the lens that limits the most its size. As there are no lenses after that aperture stop, it is the image of itself and hence the exit pupil. It is at this place or at the vicinity thereof that the in-coupler may be set.

A lens system may be referred to as afocal if either one of the object or the image is at infinity. The lens system of FIG. 4 is afocal on the image side as the rays leaving the lens are parallel for each field and there is an image at infinity.

A point position on an object may be referred to as a field. FIG. 4 illustrates rays leaving five different fields. In some cases, a pixel may be considered to be field. The size of a pixel may be assumed to be negligible as compared to other quantities in the system.

As seen in FIG. 4, each field's rays are spilled over the whole exit pupil. Hence, if we aperture down the exit pupil, we will homogeneously also cut-off on pixel's number of rays, for all fields at the same time, which means the light intensity will go down. This is the functionality of the aperture stop and this demonstrates that the exit pupil and the aperture stop are the same in that lens and that the exit pupil is real and not virtual.

The pupil can be tiled spatially. This means that the positive side of the pupil (rays hitting the pupil at y>0) will undergo one diffraction process, while rays hitting the pupil at the negative side (y<0), will undergo another diffraction process. The origin of the y axis is the optical axis. The rays hitting the pupil with some angular sign will undergo a particular process, while those hitting with the opposite sign will undergo another diffraction process. Alternatively, pupil angular tiling may lead to rays with a range [$\theta_1$, $\theta_2$] being diffracted into one direction in the waveguide while rays with [$-\theta_1$, $-\theta_2$] are diffracted into the opposite direction.

Another property of an afocal lens is to map all pixels from the display, which are referenced by their respective position in a cartesian coordinates by their (x,y) coordinates on the display, into a spherical coordinate system. With respect to FIG. 4, consider the image plane to be in the x-y plane, with the y-axis extending up and down on the page and the x-axis being perpendicular to the page. After the afocal lens system, the rays issued from one single field cannot be referenced by x or y since they spread, but they all have a unique direction which is different from one pixel to another. The lens converts pixel (x,y) coordinates to a spherical ($\theta$, $\phi$) pair. This means that for each ray's direction in the exit pupil (or in-coupler) we deal with another pixel.

Figure 5:
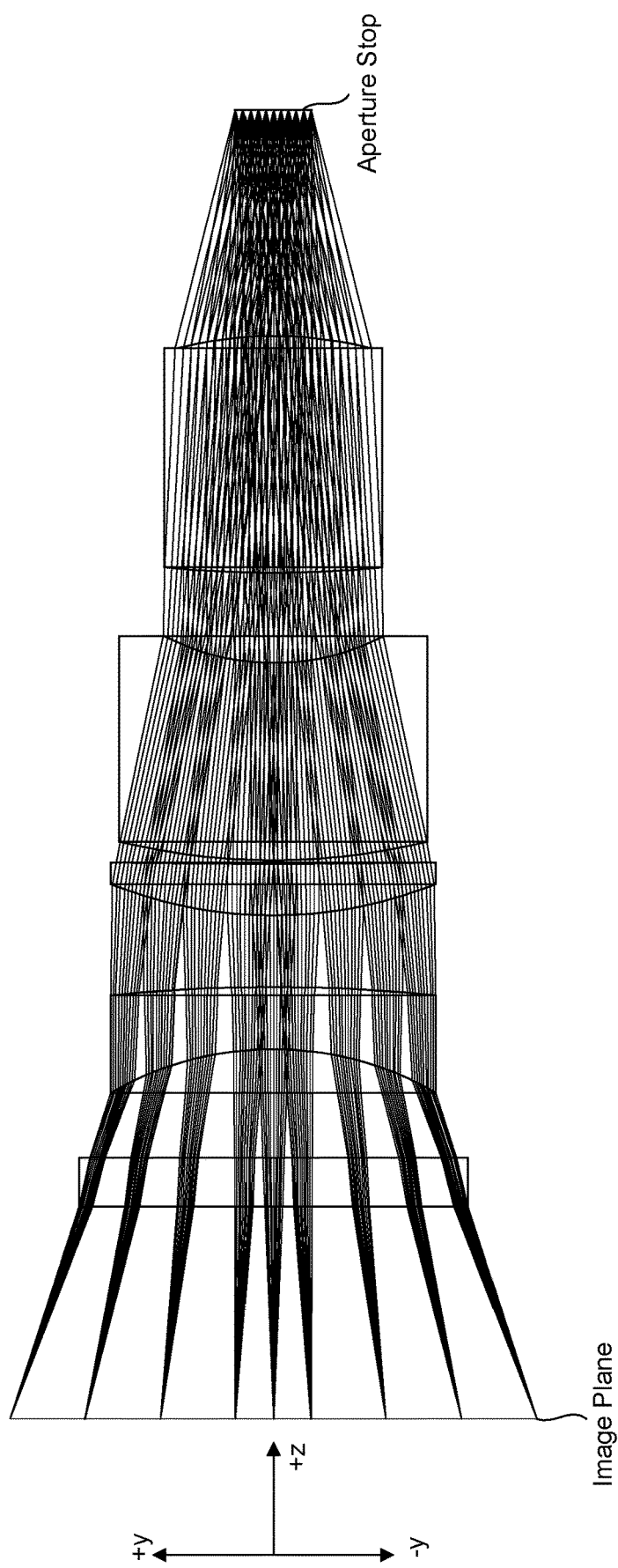
FIG. 5 is a cross-sectional side view of a lens system suitable for use in some embodiments.

In the example of FIG. 5, the rays from fields with y>0 and the rays from fields with y<0 have angles with opposite sign at the exit pupil in a polar coordinate system. If we use a spherical coordinate system with the z-axis pointing along the optical axis, then the polar angles are always between 0 and pi (positive) and only the azimuthal direction sign will distinguish the rays hitting the exit pupil 'from above' or 'from below'. At each position along the exit pupil, we have positive as well as negative ray directions in a polar coordinate system.

When symmetric diffraction modes are used, the diffraction grating will diffract an incoming ray in the plus or minus order. In some cases, if the ray has one particular sign orientation, it will diffract in one mode, and if the sign changes, it will diffract into the opposite mode. In fact, mathematically, the diffraction occurs always in all modes. Hence what we mean here is that if for a particular direction of incoming ray we diffract into a particular mode, the energy in that mode is stronger than in the mode of opposite sign. Symmetric here means that if a plus direction diffracts efficiently into the mode M, the minus direction will diffract efficiently into the −M direction. (M is a relative natural number.)

Figure 6:
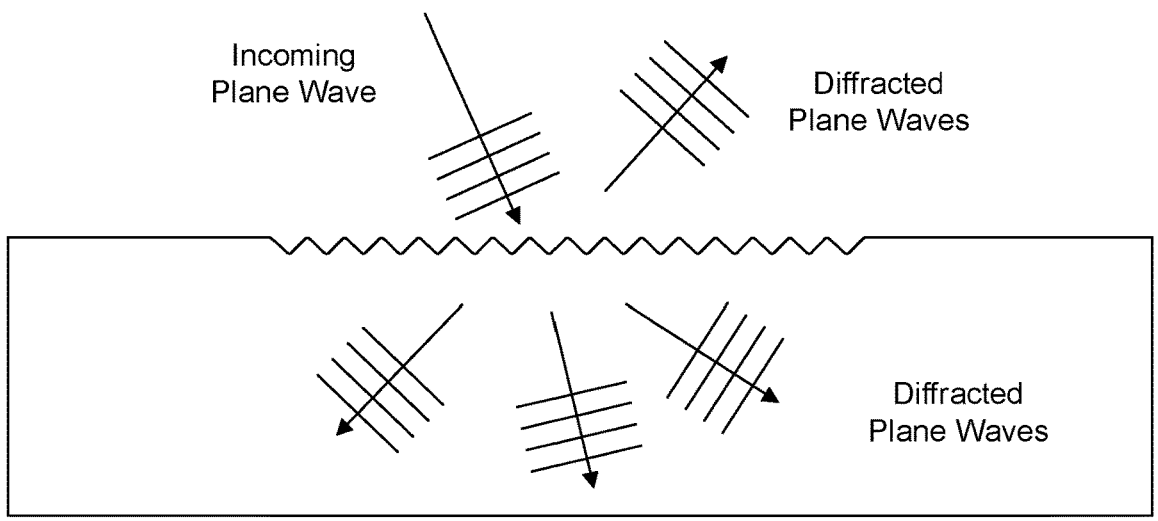
FIG. 6 is a cross-sectional view of a symmetric diffraction grating.
Figure 7:
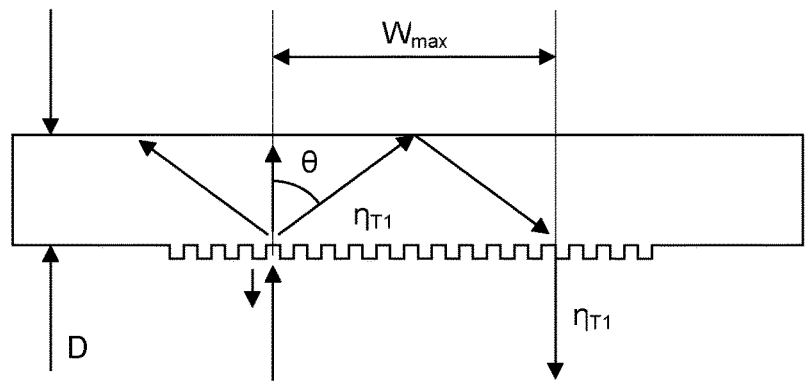
FIG. 7 is a cross-sectional view of another symmetric diffraction grating.

A symmetric diffraction grating generally permits the previous property of symmetric diffraction modes. This property may be effected with the use of a basic structure (elementary pitch) that has a left-right geometrical symmetry. Blazed and slanted grating are not symmetric diffraction gratings. Grating based on square shape steps (door shape) can be symmetric diffraction gratings. FIGS. 6 and 7 offer examples of symmetric diffraction gratings.

Example embodiments use symmetric diffraction gratings that can achieve symmetric diffraction modes of very high efficiency. For opposite signed angle of incidence, some embodiments provide +M or −M diffraction modes of high efficiency.

Figure 8:
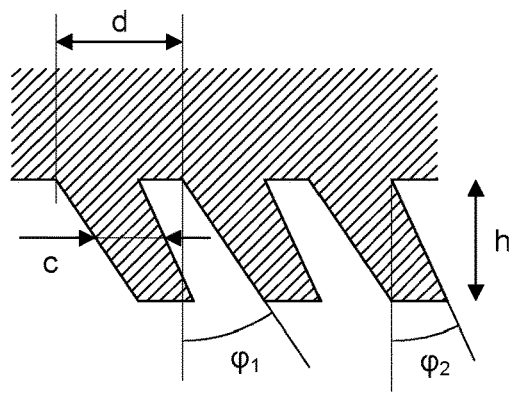
FIG. 8 is a cross-sectional view of a slanted diffraction grating.

FIG. 8 illustrates a slanted grating which, when illuminated from above, will be efficient for rays tilted toward the left (negative angles in our case) and will have the best diffraction mode towards the right hand side. When illuminated from the right hand side (positive angle), the diffraction mode toward the left will be very weak.

Figure 9:
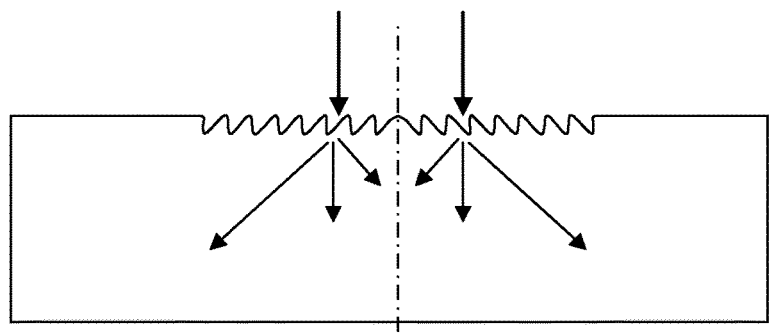
FIG. 9 illustrates use of symmetric diffraction with non-symmetrical gratings that employs two different diffraction gratings.

FIG. 9 illustrates use of symmetric diffraction with non-symmetrical gratings that employs two different diffraction gratings. The in-coupling grating in FIG. 9 has asymmetric groove profiles. The grating is split in two parts, each coupling mainly to one direction. In the system of FIG. 9, rays on the left-hand side will diffract with high efficiency toward the left, those on the right-hand side will diffract to the right, with high efficiency for a limited angular range. In addition to that process, a small part of the energy will also diffract into the opposite direction for the opposite diffraction mode.

Figure 10:
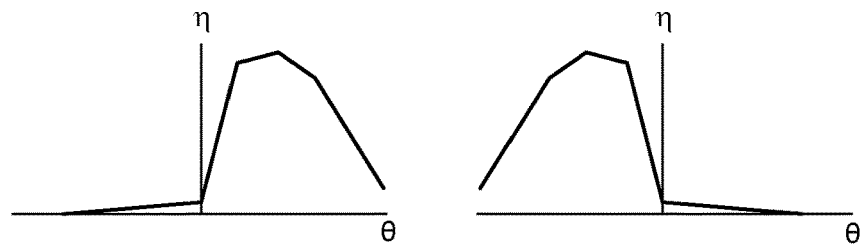
FIG. 10 schematically illustrates typical diffraction efficiencies for the gratings of FIG. 9 as a function of the angle of incidence.

In a grating as in FIG. 9, only rays hitting the right hand side grating with negative direction of propagation will efficiently diffract into the right hand side diffraction mode. Rays hitting the right hand side diffraction grating with positive angles of incidence will not diffract into the right hand side diffraction mode. (They will in fact but with a low intensity.) Only rays hitting the left hand side grating with positive direction of propagation will efficiently diffract into the left hand side diffraction mode. Rays hitting the left hand side diffraction grating with negative angles of incidence will diffract into the left hand side diffraction mode only with a low intensity. As, at each position of the exit pupil, there is an equal distribution of positive and negative angles of propagation approximately half of the light will be lost. FIG. 10 illustrates typical diffraction efficiencies for both gratings as a function of the angle of incidence.

Figure 11A:
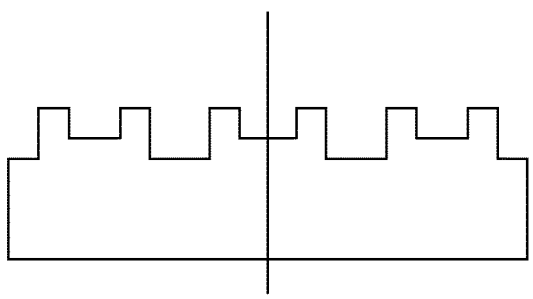
FIG. 11A is a cross-sectional view of a diffraction grating profile as used in some embodiments.
Figure 11B:
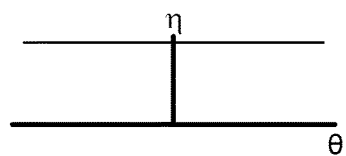
FIG. 11B is a schematic illustration of coupling of light across different angles of incidence using a grating profile as in FIG. 11A.

In contrast, a diffraction grating with a profile as illustrated in FIG. 11A, which is used in some embodiments, provides for more even coupling of light across different angles of incidence, as is illustrated schematically in FIG. 11B.

Overview of Example Waveguides with C-Shaped Geometry.

Figure 12:
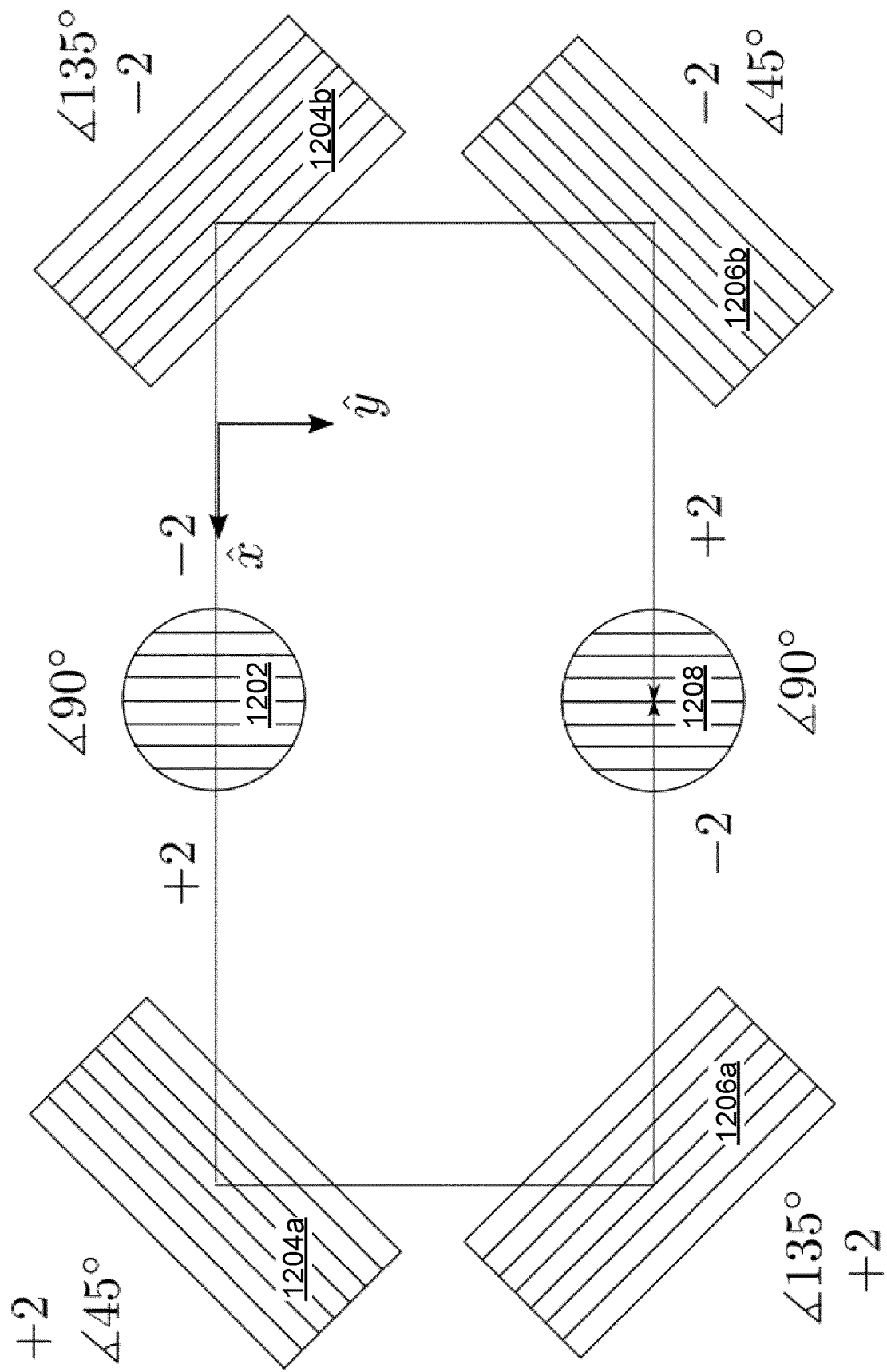
FIG. 12 is a schematic plan view of an arrangement of diffraction gratings on a waveguide display according to some embodiments.

FIG. 12 is a schematic illustration of a waveguide with a C-shaped geometry for use in some embodiments. An incoupler grating 1202 diffracts half of the angular exit pupil from an image generator into a positive order (second order in the example of FIG. 12) into the positive x direction (toward the left in FIG. 12), while the incoupler diffracts the remaining half of the exit pupil into a negative diffraction mode in the negative x direction. (In some embodiments, there may be a central region of overlap near normal incidence from which is diffracted to both directions.) The waveguide of FIG. 12 thus provides two light paths. The light in each path is deviated generally downwards (and at the same time the pupil is expanded along a generally horizontal direction) by the first set of eye pupil expanders 1204*a,b*. Then the second set of eye pupil expanders 1206*a,b* expands the pupil along a generally vertical direction while it deviates the light path toward the lower diffraction grating into an outcoupler 1208. The outcoupler extracts both light paths from the waveguide where they were bouncing by total internal reflection, and the final image can then be viewed by an eye placed perpendicularly (along the z axis) to the plane of the figure.

The incoupler pitch size may be set based on parameters such as the refractive index of the waveguide, the amount of angular overlap near normal incidence, and the grazing angle in the waveguide. The incoupler pitch size may be selected based on a desired horizontal field of view, for example it may be selected to substantially maximize the horizontal field of view.

In examples provided below, the in-coupler's parameters are indexed by 1. The first eye pupil expanders by 2, the second eye pupil expanders by 3, and the out-coupler by 4. Incoming rays are indexed by 0. Rays diffracted by element 1 are indexed by 1, and so on. Rays emerging from the system are hence indexed by 4. For a waveguide of refractive index $n_2$=1.52 nm and for a red wavelength of $\lambda$=625 nm, for the grazing angle of $\theta_2^g$=75° in a case with no angular overlap, using the second diffractive order (M=2), the pitch $\Lambda_1$ of the in-coupler may be selected according to $$\Lambda_1 = M\lambda N = \frac{M\lambda}{n_2 \sin \theta_2^g} = 851.38 \text{ nm}$$

where $= N = 1/n_2 \sin\theta_2^g$.

Then for eye pupil expanders at 45°, the pitch sizes $\Lambda_2$ and $\Lambda_3$ of the eye pupil expanders may be selected according to $$\Lambda_2=\Lambda_3=M\lambda \sin (45-\phi/2)$$

Where $$\sin \Phi=1-N$$

Which leads to a pitch of 729.46 nm. The out-coupler may then be selected with the same pitch size as the incoupler. With this choice of parameters, using the second diffractive order for each grating, |M|=2 for each grating, results in the diagram of FIG. 13.

Figure 13:
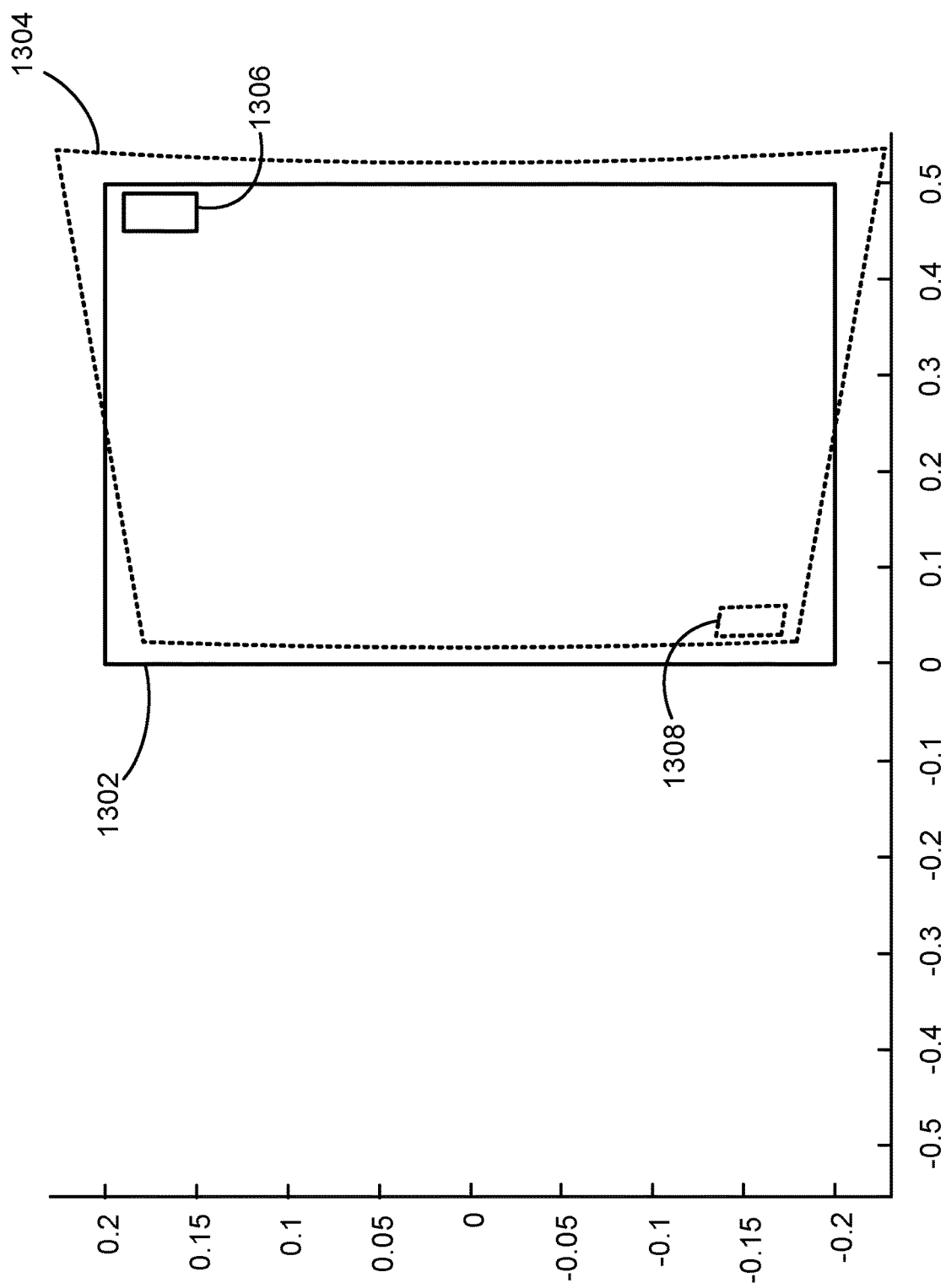
FIG. 13 is a diagram illustrating undesirable distortion that occurs in some arrangements of diffraction gratings on a waveguide.

In the diagram of FIG. 13, a regular rectangle 1302 represents pixels of one half of a display before propagation through a waveguide with the above parameters. These pixels map to an output array illustrated by region 1304 that has been distorted to a more trapezoidal shape. Pixels within the original region 1302 do not superimpose onto the distorted region 1305, and the rectangular half display does not image into a rectangle. Moreover, pixels near the periphery, such as those in rectangle 1306, have been mapped to the center, at rectangle 1308. Such distortion cannot generally be corrected electronically.

It is desirable to have little to no distortion in a C-shape geometry in order to be compatible with a pupil tiling in-coupler for very high field of view systems.

Example Parameters for Distortion Reduction.

Figure 14A:
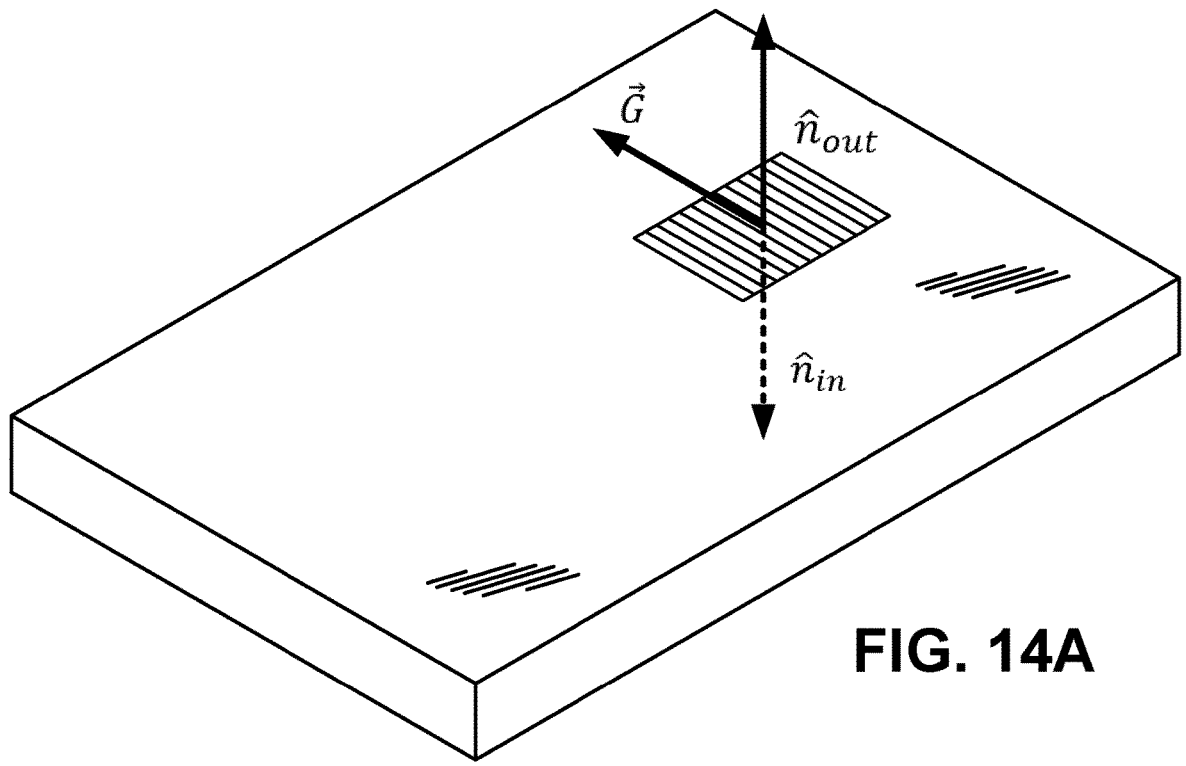
FIGS. 14A and 14B are schematic isometric views of a grating on a surface, illustrating vectors used in the grating equation.
Figure 14B:
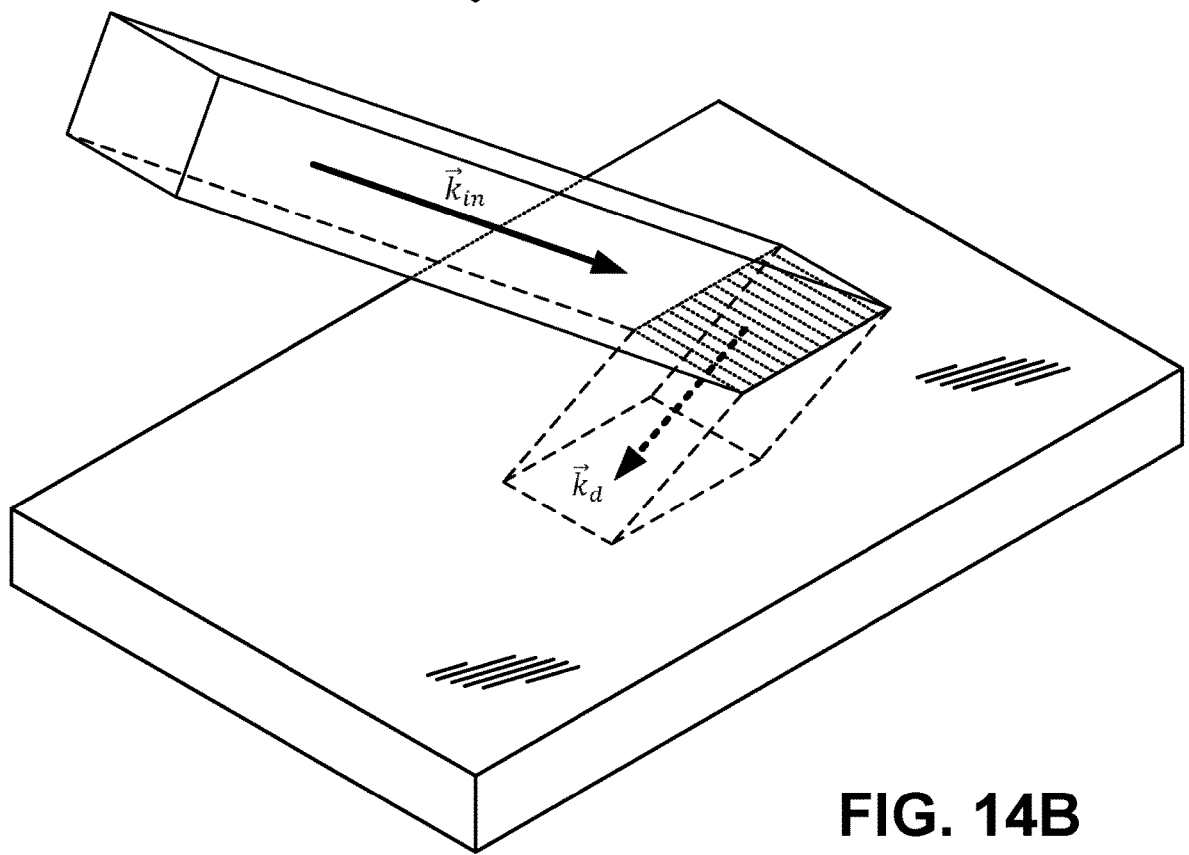

The grating equation, describing the relationship between an incident light beam and one or more diffracted light beams, can be expressed in a vector format using vectors as shown in FIG. 14A-14B. For the sake of clarity, FIGS. 14A-14B illustrate a single diffraction grating on a substrate, where the substrate may be viewed as a portion of a waveguide. A grating vector $\vec{G}$, as illustrated in FIG. 14A, points in a direction parallel to the lines of a diffraction grating, and it has a magnitude of $|\vec{G}|=2\pi/\Lambda$, where $\Lambda$ is the pitch of the grating. (To avoid confusion, it may be noted that in some sources, the direction of the "grating vector" is considered to be perpendicular to the grating lines, and the grating equation is changed accordingly.) An outward normal $\hat{n}_{out}$ is a unit vector that is normal to the plane of the grating and points outward from the grating surface. An inward normal $\hat{n}_{in}$ is a unit vector that is normal to the plane of the grating and points inward from the grating surface, such that $\hat{n}_{out}=-\hat{n}_{in}$.

As illustrated in FIG. 14B, the wavevector of an incident beam is expressed as $\vec{k}_{in}$, which points in the direction of travel of the incident beam and has a magnitude of $|\vec{k}_{in}|=2\pi n_1/\lambda$, where $n_1$ is the refractive index of the medium in which the incoming beam is traveling, and $\lambda$ is the wavelength of the beam in a vacuum. Similarly, the wavevector of a diffracted beam is expressed as $\vec{k}_d$, which points in the direction of travel of the diffracted beam and has a magnitude of $|\vec{k}_d|=2\pi n_2/\lambda$, where $n_2$ is the refractive index of the medium in which the diffracted beam is traveling (which may be the same as the medium of the incident beam). It may be noted that a number of diffracted beams can be generated from a single incoming beam, including some diffracted beams that are directed outside the substrate, but only a single diffracted beam is shown for the sake of simplicity.

Using the grating vectors and wavevectors of FIG. 14A-14B, the grating equation, representing a relationship between an incoming beams and one or more diffracted beams, may be expressed as $$\vec{k}_d \wedge \hat{n}_{in} + \vec{k}_{in} \wedge \hat{n}_{out} = M\vec{G}$$

where M is an integer representing the diffractive order. The operator "∧" here signifies the vector cross product (sometimes signified in other sources by "×"). This equation is satisfied both in the case of reflective diffractive orders (in which case the medium of the incident beam is the same as the medium of the diffracted beam, such that $n_1=n_2$), and in the case of transmissive diffractive orders (in which case the medium of the incident beam is not necessarily the same as the medium of the diffracted beam).

Not every mathematical solution to the above equation necessarily represents a physical situation. For example, if $\vec{k}_d$ satisfies the equation, then vector ($\vec{k}_d + p \hat{n}_{in}$) will also satisfy the equation for arbitrary values of p. That is, the above grating equation does not, by itself, provide a unique solution for wavevector components normal to the plane of the grating, referred to here as z-components. However, the magnitude of the z-component $k_z$ can be recovered based on the norm, $$|\vec{k}| = 2\pi n/\lambda = \sqrt{k_x^2 + k_y^2 + k_z^2}$$

with the sign of the z-component $k_z$ being resolved based on physical constraints. For example, the sign of $k_z$ is inverted when a beam is reflected but remains the same when a beam is transmitted.

Figure 15:
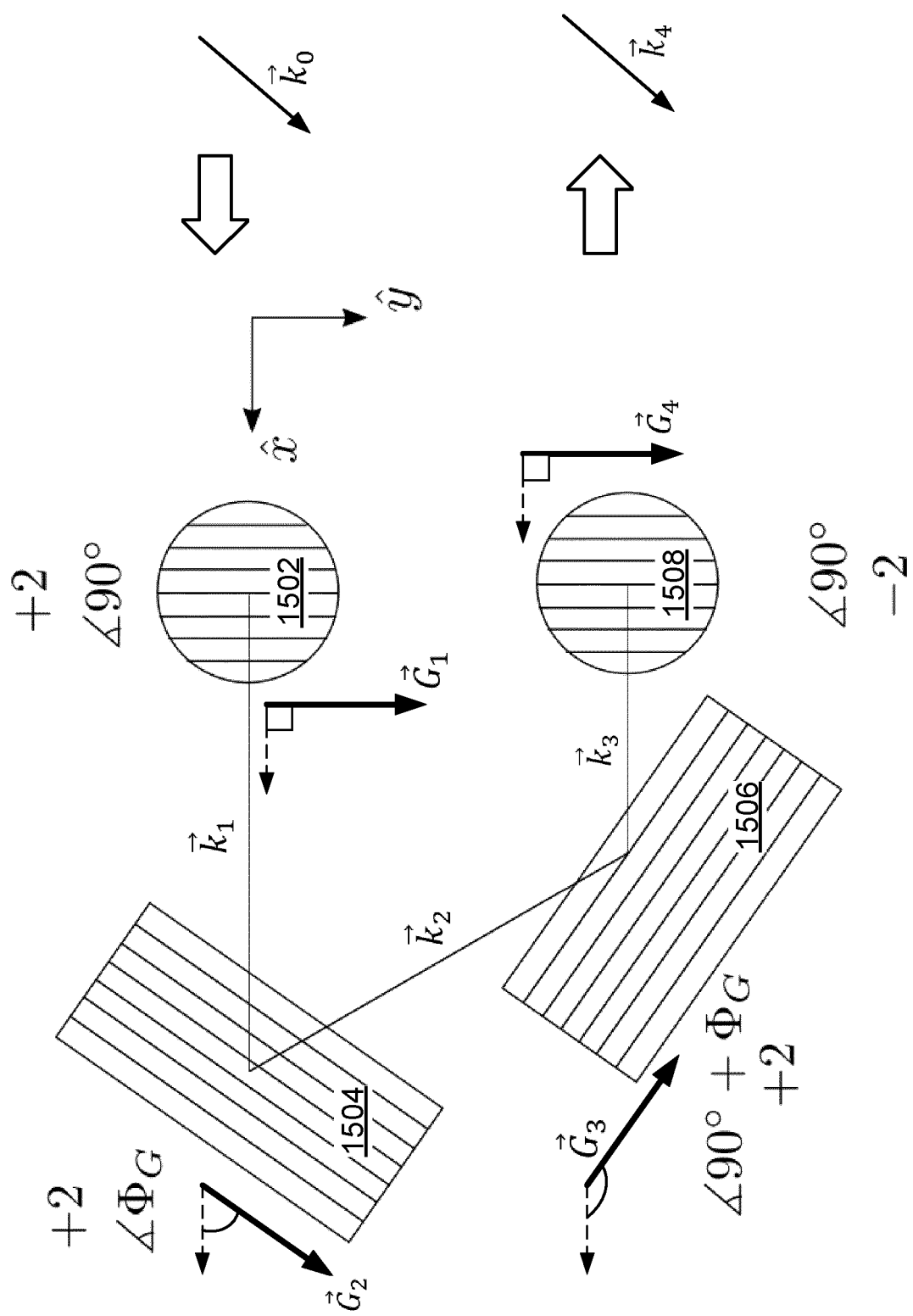
FIG. 15 is a schematic plan view of an arrangement of diffraction gratings on a waveguide display according to some embodiments.

FIG. 15 illustrates a diffraction grating layout for a portion of a waveguide display in accordance with some embodiments. As compared to the waveguide layout of FIG. 12, FIG. 15 for the sake of simplicity leaves out the eye pupil expanders on the right (analogous to 1204b and 1206b of FIG. 12), but it should be understood that some embodiments include eye pupil expanders on the right and that they may be arranged symmetrically with the eye pupil expanders on the left side of FIG. 15.

As illustrated in FIG. 15, an in-coupler grating 1502 has grating vector $\vec{G}_1$ oriented at a 90° angle with respect to an x-axis in the plane of the gratings. A first eye pupil expander 1504 has grating vector $\vec{G}_2$ oriented at an angle of $\Phi_{G_2}$ with respect to the x-axis. A second eye pupil expander 1506 has grating vector $\vec{G}_3$ oriented at an angle of $\Phi_G$, with respect to the x-axis. In some embodiments, $\vec{G}_1$ and $\vec{G}_2$ are perpendicular to one another, and an angle $\Phi_G$ is defined such that $$\Phi_G = \Phi_{G_2} \text{ and } \Phi_{G_3} = 90° + \Phi_G.$$

An out-coupler grating 1508 has grating vector $\vec{G}_4$ oriented at an angle of 90° with respect to the x-axis.

In operation, a light beam (which may be generated by an image generator) with wavevector $\vec{k}_0$ is coupled into the waveguide with in-coupler 1502 using transmissive diffractive order $M_1$. The in-coupled beam has wavevector $\vec{k}_1$. At least a portion of that in-coupled beam is diffracted by the first eye pupil expander 1504 to reflective diffractive order $M_2$, resulting in a beam with wavevector $\vec{k}_2$. At least a portion of that beam is diffracted to reflective diffractive order $M_3$ by the second eye pupil expander 1506, resulting in a beam with wavevector $\vec{k}_3$. At least a portion of that beam is out-coupled with grating 1508 using diffractive order $M_4$, with the out-coupled beam having wavevector $\vec{k}_4$. In some embodiments, each of the first three gratings 1502, 1504, 1506 uses the +2 diffraction order while the fourth grating 1508 uses the −2 diffraction order. However, different diffraction orders may be used in different embodiments.

Figure 16A:
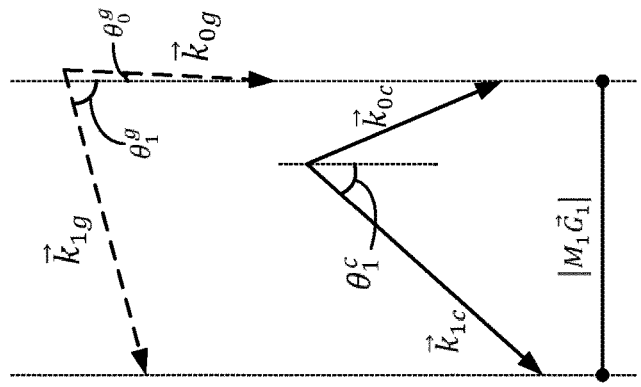
FIG. 16A is a schematic side view illustrating wavevectors of light incident on an incoupler grating and resulting wavevectors of diffracted light.
Figure 16A:
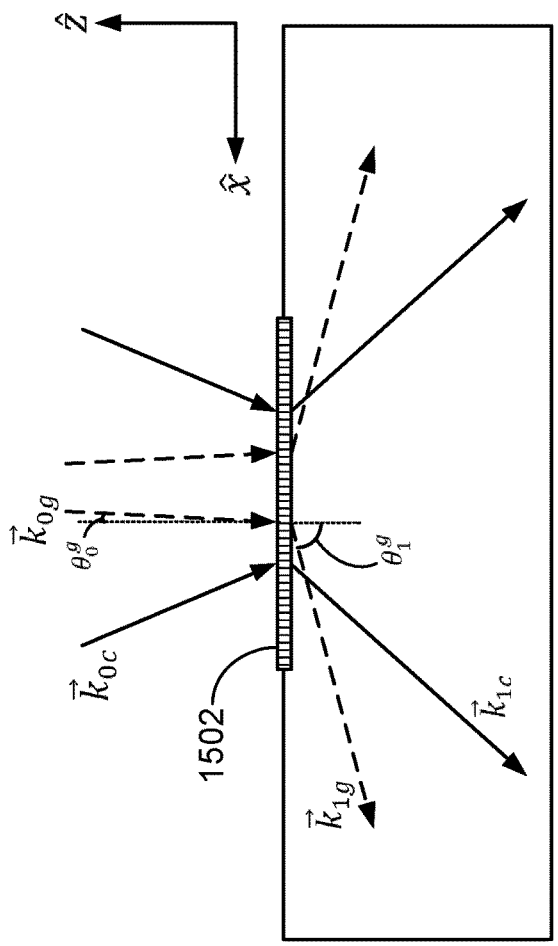

FIG. 16A is a schematic side view illustrating the operation of in-coupler grating 1502 on the wavevector of light beams. An incoming beam with wavevector $\vec{k}_{0g}$ and angle $\theta_0^g$ (in the plane of the figure) diffracts to a beam with wavevector $\vec{k}_{1g}$ and grazing angle $\theta_1^g$. An incoming beam with wavevector $\vec{k}_{0c}$ diffracts to wavevector $\vec{k}_{1c}$, which is oriented at the critical angle $\theta_1^c$ for total internal reflection. Wavevectors with incident angles between those of $\vec{k}_{0g}$ and $\vec{k}_{0c}$ propagate through the waveguide to the left (in this example). Symmetrically-oriented wavevectors (with reversed x-components) propagate through the waveguide to the right. There may be some overlap between leftward and rightward propagation, e.g. a portions of incident light with near-normally-incident wavevectors may propagate in both directions to avoid visible gaps between the left and right halves of the field of view.

In some embodiments, the pitch $\Lambda_1$ of the in-coupler grating is selected based on the grazing angle $\theta_1^g$ and on the incident angle $\theta_0^g$ that diffracts to the grazing angle. The angle $\theta_0^g$ may be used to represent an amount of angular overlap between the left and right halves of the field of view. Using the grating equation (a geometric interpretation of which is illustrated graphically in FIG. 16A), the pitch $\Lambda_1$ may be selected as follows $$M_1|G_1| = \hat{x} \cdot \vec{k}_{1g} - \hat{x} \cdot \vec{k}_{0g}$$

$$\frac{M_1}{\Lambda_1} = \left(\frac{n_2}{\lambda}\right) \sin\theta_1^g - \left(\frac{n_1}{\lambda}\right) \sin\theta_0^g$$

$$\Lambda_1 = \frac{M_1 \lambda}{n_2 \sin\theta_1^g - n_1 \theta_0^g}$$

For example values of $\theta_1^g=75°$ and $\theta_0^g=2.97°$, with $n_1=1$ and $n_2=1.52$, and calculated for wavelength $\lambda=625$ nm, a pitch of $\Lambda_1=882.5$ nm may be selected.

Figure 16B:
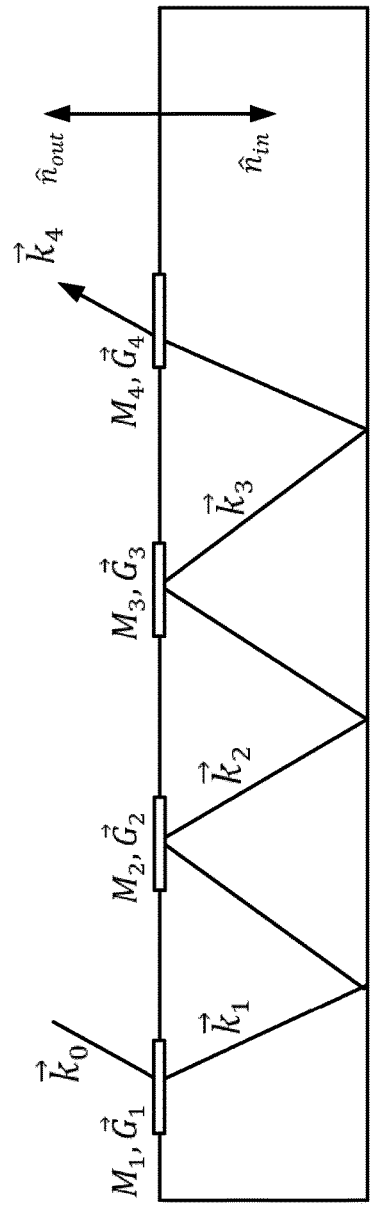
FIG. 16B is a schematic unfolded side illustration of propagation of a light ray through the waveguide of FIG. 15.

FIG. 16B is a schematic "unfolded" side view of the passage of a light ray through the waveguide of FIG. 15.

Using the grating equations as described above, the wavevectors may be described by the following relationships:

$$\vec{k}_1 \wedge \hat{n}_{in} + \vec{k}_0 \wedge \hat{n}_{out} = M_1 \vec{G}_1$$

$$\vec{k}_2 \wedge \hat{n}_{out} + \vec{k}_1 \wedge \hat{n}_{in} = M_2 \vec{G}_2$$

$$\vec{k}_3 \wedge \hat{n}_{out} + \vec{k}_2 \wedge \hat{n}_{in} = M_3 \vec{G}_3$$

$$\vec{k}_4 \wedge \hat{n}_{out} + \vec{k}_3 \wedge \hat{n}_{in} = M_4 \vec{G}_4$$

Canceling $\vec{k}_1$, $\vec{k}_2$, and $\vec{k}_3$ from these equations, the relationship between the incoming beam $\vec{k}_1$ and the outgoing beam $\vec{k}_4$ may be described by $$(\vec{k}_4 - \vec{k}_0) \wedge \hat{n}_{out} = M_4 \vec{G}_4 + M_3 \vec{G}_3 + M_2 \vec{G}_2 - M_1 \vec{G}_1$$

To avoid distortion, it is desirable for the difference between the x- and y-components of the incoming beam $\vec{k}_0$ and of the outgoing beam $\vec{k}_4$ to be small, e.g. substantially equal to zero. The z-components of $\vec{k}_0$ and $\vec{k}_4$ may be opposite in sign depending on the configuration of the waveguide. For example, the z-components may be opposite in sign if the image generator and the viewer are on the same side of the waveguide, and they may have the same sign if the image generator and the viewer are on opposite sides of the waveguide.

Given the above equation, and setting the condition $(\vec{k}_4 - \vec{k}_0)=0$, the following grating properties may be seen to provide no distortion $$0 = M_4\vec{G}_4 + M_3\vec{G}_3 + M_2\vec{G}_2 - M_1\vec{G}_1$$

It may be noted that this relationship is satisfied in some embodiments that use diffractive orders other than the first diffractive order. For example, in some embodiments, the above relationship is substantially satisfied by a system in which some or all of the diffraction gratings use a second diffractive order. In some embodiments, different diffractive orders are used for different gratings while substantially satisfying the above relationship. For example, in some embodiments, all gratings except the out-coupler are configured to use the second diffractive order, while the out-coupler is configured to use the first diffractive order. Use of the first diffractive order at the out-coupler may help to reduce stray light effects that could otherwise be caused by diffraction of the real-world image.

Because the grating equation is not sensitive to changes in the z-components of wavevectors, this equation may be used regardless of whether the z-component of $\vec{k}_4$ is inverted relative to the z-component of $\vec{k}_1$.

Because the sum of the vectors $(M_4\vec{G}_4 + M_3\vec{G}_3 + M_2\vec{G}_2 - M_1\vec{G}_1)$ is zero, it follows that the x- and y-components of that sum individually add to zero. As for the x-components, this gives $$0 = M_4 G_{4x} + M_3 G_{3x} + M_2 G_{2x} - M_1 G_{1x}$$
$$0 = M_3 |G_3| \cos(90° + \Phi_G) + M_2 |G_2| \cos(\Phi_G)$$
$$0 = -M_3 |G_3| \sin(\Phi_G) + M_2 |G_2| \cos(\Phi_G)$$
$$0 = M_3 |G_3| \tan(\Phi_G) - M_2 |G_2|$$
$$0 = 2\pi M_3 \tan(\Phi_G)/\Lambda_3 - 2\pi M_2/\Lambda_2$$
$$M_2/\Lambda_2 = M_3 \tan(\Phi_G)/\Lambda_3$$
$$\Lambda_3 = \frac{M_3}{M_2}\Lambda_2 \tan(\Phi_G)$$

In some embodiments, the pitch $\Lambda_2$ and angle $\Phi_G$ of the first eye pupil expander are selected to substantially maximize the field of view, and the pitch $\Lambda_3$ and angle $\Phi_{G_3}=90°+\Phi_G$ of the second eye pupil expander are selected using the equations above to reduce or minimize distortion.

In some embodiments, to substantially maximize the vertical field of view, the pitch $\Phi_2$ and angle $\Phi_G$ of the first eye pupil expander have one or more of the following relationships. In the following embodiments, it is convenient to use the parameter $\Phi_K$, where $$\Phi_K = 90° - \Phi_G.$$

It may further be recalled as noted above that $N = 1/n_2 \sin\theta_2^g$.

In a first group of embodiments, the angle $\Phi_K$ falls within the following range:

$$\frac{1}{2}\left(\cos^{-1}\left(\frac{N}{\sqrt{2}}\right) + 45°\right) < \phi_K \leq 90°$$

In the first group of embodiments, the pitch $\Lambda_2$ of the first eye pupil expander may be selected according to $$\Lambda_2 = \frac{M_2 \lambda}{2 \times \cos(\phi_K - \Delta\phi/2)}$$

where $$\Delta\phi = 2\cos^{-1}\left(\sqrt{\frac{(N+1)^2(\tan\phi_K)^2}{(1-N)^2 + (N+1)^2(\tan\phi_K)^2}}\right).$$

In a second group of embodiments, the angle $\Phi_K$ falls within the following range:

$$\frac{1}{2}\left(\cos^{-1}\left(\frac{N}{2\sin\tan^{-1}N}\right) + \tan^{-1}N\right) < \phi_K \leq \frac{1}{2}\left(\cos^{-1}\left(\frac{N}{\sqrt{2}}\right) + 45°\right)$$

In the second group of embodiments, the pitch $\Lambda_2$ of the first eye pupil expander may be selected according to $$\Lambda_2 = M_2 \lambda \sin(\phi_K - \Delta\phi/2)$$

where $$\Delta\phi = \sin^{-1}(\sin(2\phi_K - N)).$$

In a third group of embodiments, the angle $\phi_K$ falls within the following range:

$$\frac{1}{2}\left(\cos^{-1}\left(\frac{N+2-N^2}{2\sqrt{N+1}}\right) + \sin^{-1}\sqrt{\frac{3-N}{4}}\right) <$$
$$\phi_K \leq \frac{1}{2}\left(\cos^{-1}\left(\frac{N}{2\sin\tan^{-1}N}\right) + \tan^{-1}N\right)$$

In the third group of embodiments, the pitch $\Lambda_2$ of the first eye pupil expander may be selected according to $$\Lambda_2 = \frac{NM_2\lambda}{2 \times \cos(\phi_K - \Delta\phi/2)}$$

where $$\Delta\phi = 2\tan^{-1}\left[\frac{\cos\phi_K - \sqrt{\Delta}}{2(\alpha + \sin\phi_K)}\right],$$

with $$\alpha = \frac{1-N^2}{8 \times \sin\phi_K}$$

and $$\Delta = (\cos\phi_K)^2 - 4\alpha(\alpha + \sin\phi_K).$$

In a fourth group of embodiments, the angle $\phi_K$ satisfies:

$$\phi_K \leq \frac{1}{2}\left(\cos^{-1}\left(\frac{N+2-N^2}{2\sqrt{N+1}}\right) + \sin^{-1}\sqrt{\frac{3-N}{4}}\right)$$

In the fourth group of embodiments, the pitch $\Lambda_2$ of the first eye pupil expander may be selected according to $$\Lambda_2 = \frac{N M_2 \lambda}{\cos(\phi_K - \Delta\phi/2) + \sqrt{N^2(\sin(\phi_K - \Delta\phi/2))^2}}$$

$$\Delta\phi = 2\cos^{-1}\left[\frac{\sqrt{1+\cos(2\phi_K)}}{\sqrt{2} \times \cos(2\phi_K)}\right].$$

where

Figure 17:
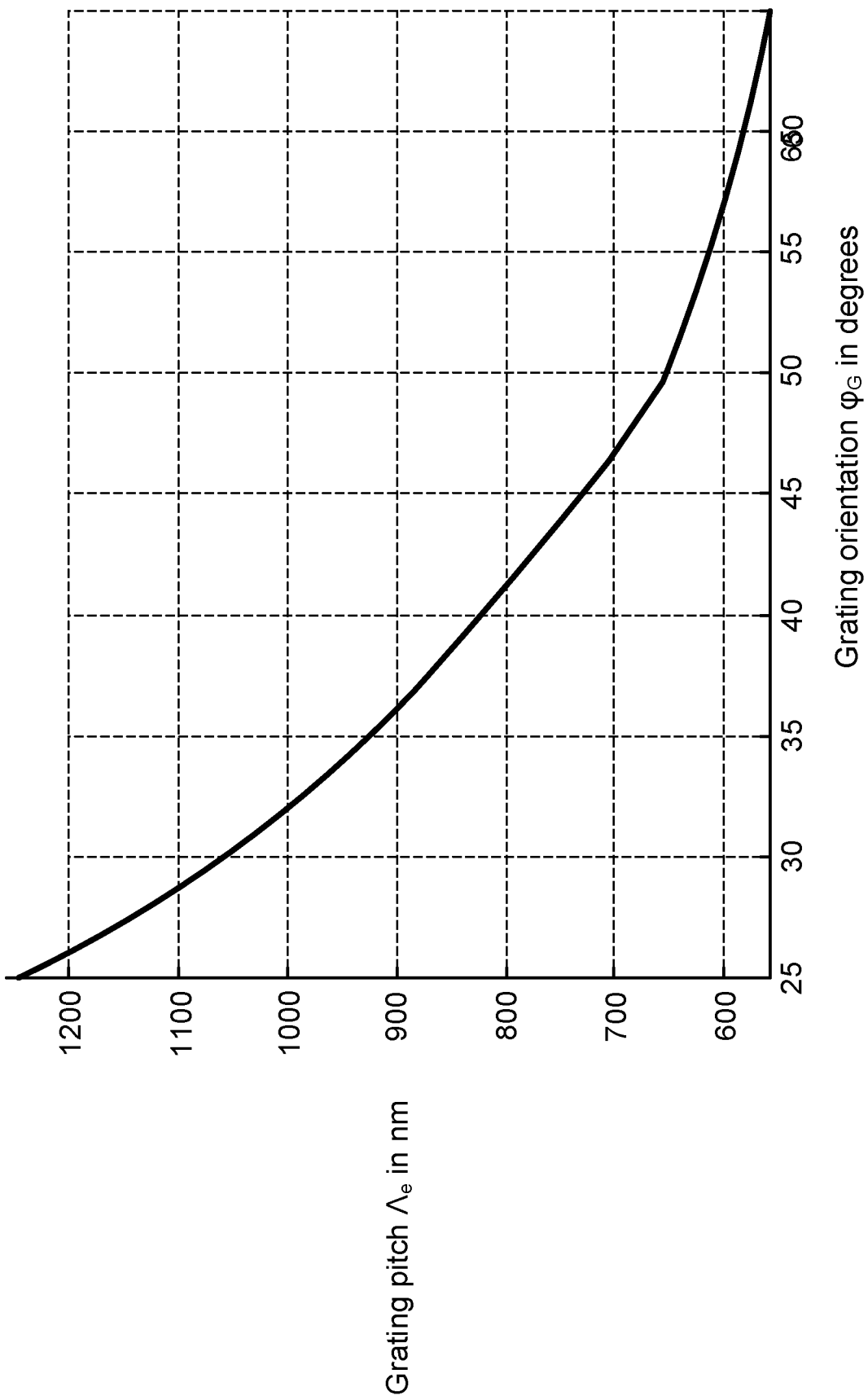
FIG. 17 is a graph illustrating a relationship between eye pupil expander and grating pitch that may be implemented in some embodiments.

In some embodiments, where $\Phi_G$ is around 45°, $\Lambda_2$ and $\Lambda_3$ may be selected as follows $$\Lambda_2 = \Lambda_3 = M\lambda \sin\left(\Phi_G - \frac{\varphi}{2}\right)$$

where $$\varphi = \sin^{-1}\left(1 - \frac{1}{n_2 \sin\theta_2^g}\right)$$

and where $\theta_2^g$ is a selected grazing angle, which may be 75°. Example solutions for different grating orientations $\Phi_G$ are illustrated in FIG. 17.

Starting again from the condition that the sum of the vectors $(M_4\vec{G}_4 + M_3\vec{G}_3 + M_2\vec{G}_2 - M_1\vec{G}_1)$ is zero, the condition that the respective y-components add to zero gives $0 = M_4 G_{4y} + M_3 G_{3y} + M_2 G_{2y} - M_1 G_{1y}$ $0 = M_4|\vec{G}_4| + M_3|G_3|\sin(90°+\Phi_G) + M_2|\vec{G}_2|\sin(\Phi_G) - M_1|\vec{G}_1|$ $0 = M_4/\Lambda_4 + M_3 \cos(\Phi_G)/\Lambda_3 + M_2 \sin(\Phi_G)/\Lambda_2 - M_1/\Lambda_1$ Substituting in the above expression for $\Lambda_3$ gives $$\frac{M_4}{\Lambda_4} + M_3 \cos(\Phi_G)\frac{M_2}{\Lambda_2 M_3 \tan(\Phi_G)} + \frac{M_2 \sin(\Phi_G)}{\Lambda_2} - \frac{M_1}{\Lambda_1} = 0$$

which reduces through trigonometric identities to $$\frac{M_4}{\Lambda_4} - \frac{M_1}{\Lambda_1} + \frac{M_2}{\Lambda_2 \sin(\Phi_G)} = 0$$

The above expression may be used to determine the pitch $\Lambda_4$ of the out-coupler.

Using the expressions above, in some embodiments, $\Phi_G = 45°$ and the pitches and grating order of the different grating may be selected as follows, for an example embodiment with an overlap angle of zero:

$\Lambda_1 = 851.38$ nm, $M_1 = 2$
$\Lambda_2 = 729.46$ nm, $M_2 = 2$
$\Lambda_3 = 729.46$ nm, $M_3 = 2$
$\Lambda_4 = 1308.64$ nm, $M_4 = -2$ Using only first diffractive orders, the pitches and grating orders in some embodiments may be selected as follows:

$\Lambda_1 = 425.69$ nm, $M_1 = 1$
$\Lambda_2 = 364.73$ nm, $M_2 = 1$
$\Lambda_3 = 364.73$ nm, $M_3 = 1$
$\Lambda_4 = 654.32$ nm, $M_4 = -1$ In some embodiments, different gratings use different diffractive orders. In an example of one such embodiment, the pitches and grating orders in some embodiments may be selected as follows:

$\Lambda_1 = 851.38$ nm, $M_1 = 2$
$\Lambda_2 = 729.46$ nm, $M_2 = 2$
$\Lambda_3 = 729.46$ nm, $M_3 = 2$
$\Lambda_4 = 654.32$ nm, $M_4 = -1$ In some embodiments, all grating pitches are above 600 nm.

In some embodiments, one or more of the grating pitches have values within 5% of the above values. In some embodiments, one or more of the grating pitches have values within 10% of the above values. In some embodiments, one or more of the grating pitches have values within 20% of the above values.

In some embodiments, the out-coupler grating is configured to use a first diffractive order, such that $|M_4|=1$, and at least one of the in-coupler gratings and the eye pupil expander gratings is configured to use a second diffractive order. The use of the first diffractive order for the out-coupler grating generally provides for better transparency of the out-coupler waveguide to light from the ambient scenery (e.g. light 120 of FIG. 1A), while use of the second diffractive order for one or more of the other gratings simplifies fabrication of those gratings by allowing for a larger grating pitch. In some embodiments, the out-coupler grating is configured to use a first diffractive order, such that $|M_4|=1$, and the in-coupler grating and the first and second eye pupil expander gratings are all configured to use a second diffractive order, such that $|M_1|=|M_2|=|M_3|=2$.

Figure 18:
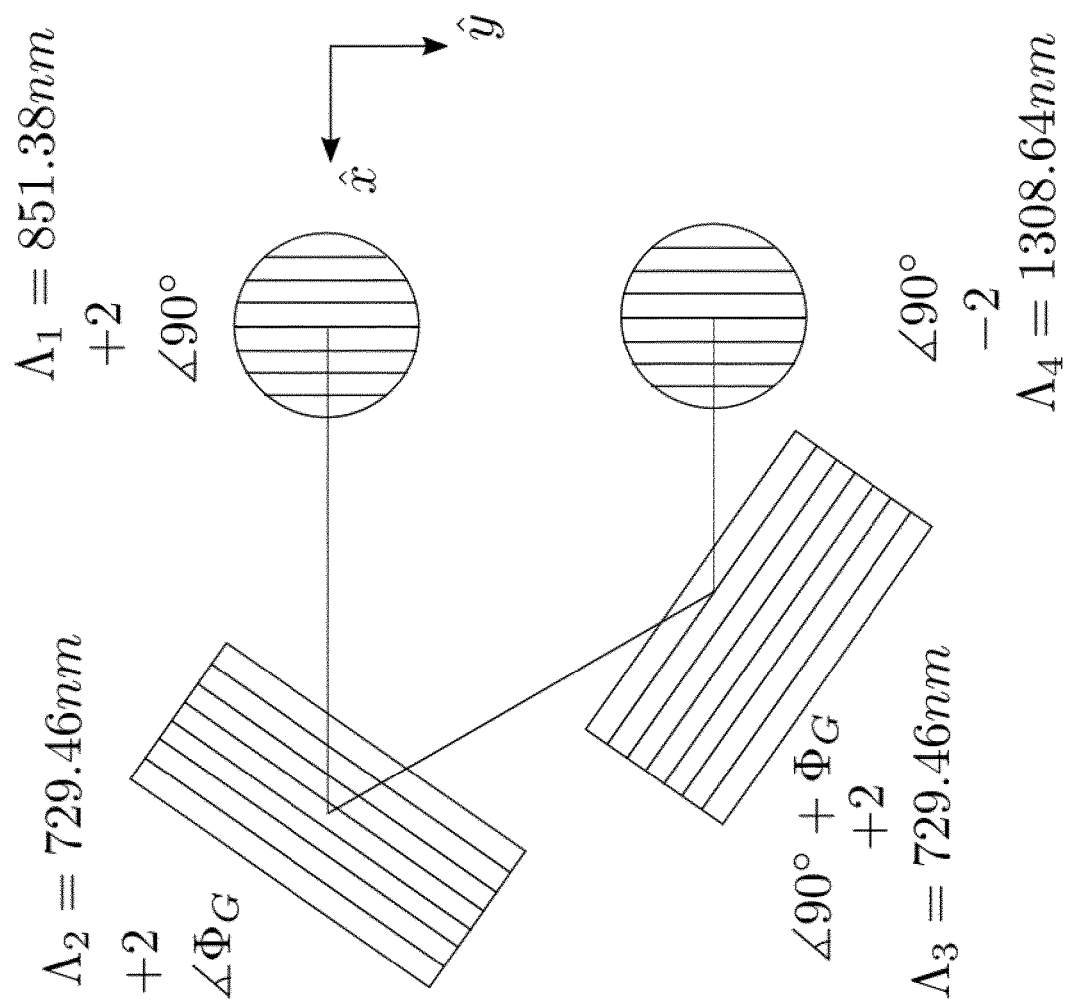
FIG. 18 is a schematic plan view of an arrangement of diffraction gratings on a waveguide display illustrating parameters used in some embodiments.

FIG. 18 is a schematic illustration of a portion of a waveguide display according to an embodiment that uses the dimensions selected above. It should be noted that the waveguide display of FIG. 18 may also include additional eye pupil expanders on the right side of the in-coupler and out-coupler, e.g., in a symmetric configuration with respect to the eye pupil expanders shown on the left.

It may be noted that other relationships can be implemented based on the configurations described above. For example, in some embodiments, the grating pitches may be selected to substantially satisfy $$\left(\frac{M_2}{\Lambda_2}\right)^2 + \left(\frac{M_3}{\Lambda_3}\right)^2 = \left(\frac{M_1}{\Lambda_1} - \frac{M_4}{\Lambda_4}\right)^2$$

Figure 19A:
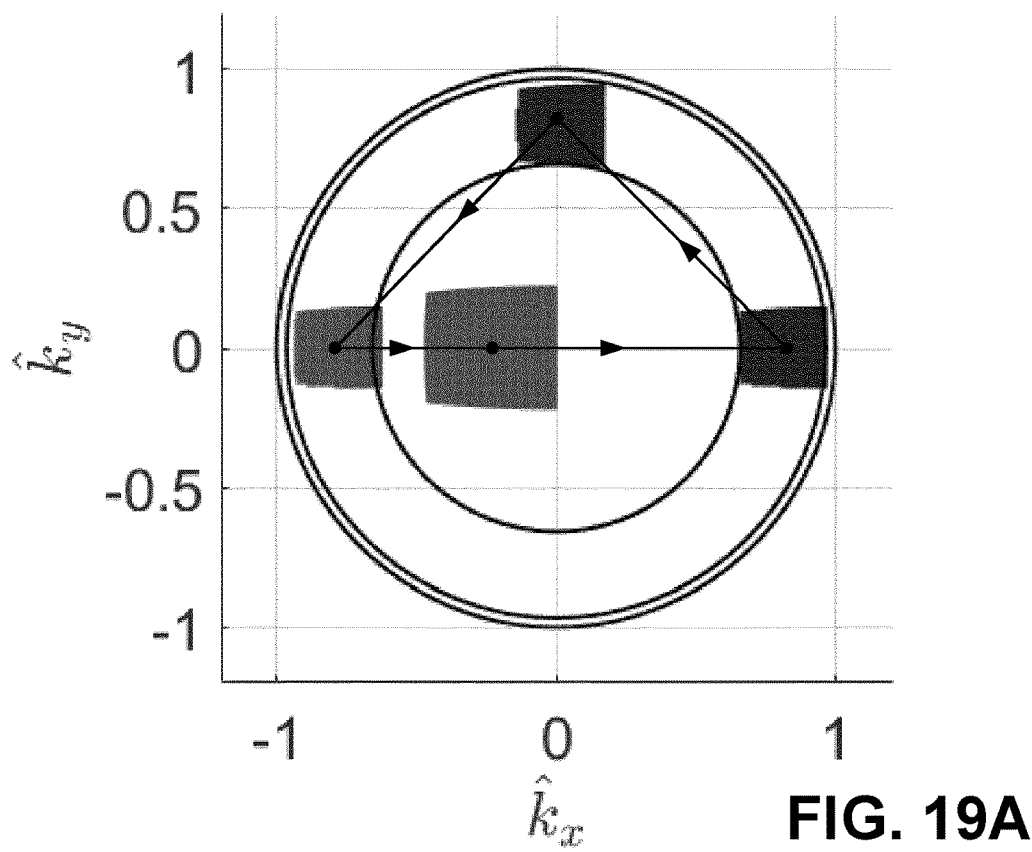
FIGS. 19A and 19B are wavevector diagrams representing propagation of light through example waveguide systems.
Figure 19B:
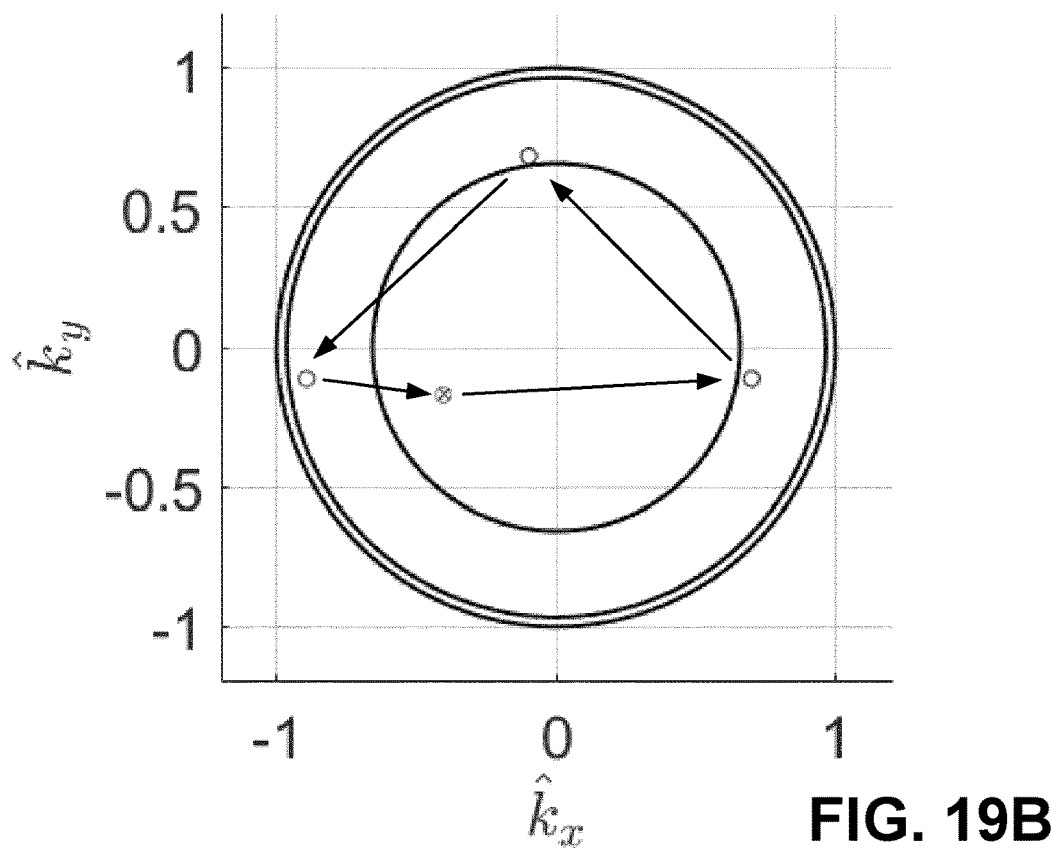

FIGS. 19A and 19B are wavevector diagrams representing propagation of light through example waveguide systems. FIG. 19A illustrates the propagation of one half of a field of view. FIG. 19B illustrates propagation of a single ray.

Figure 20:
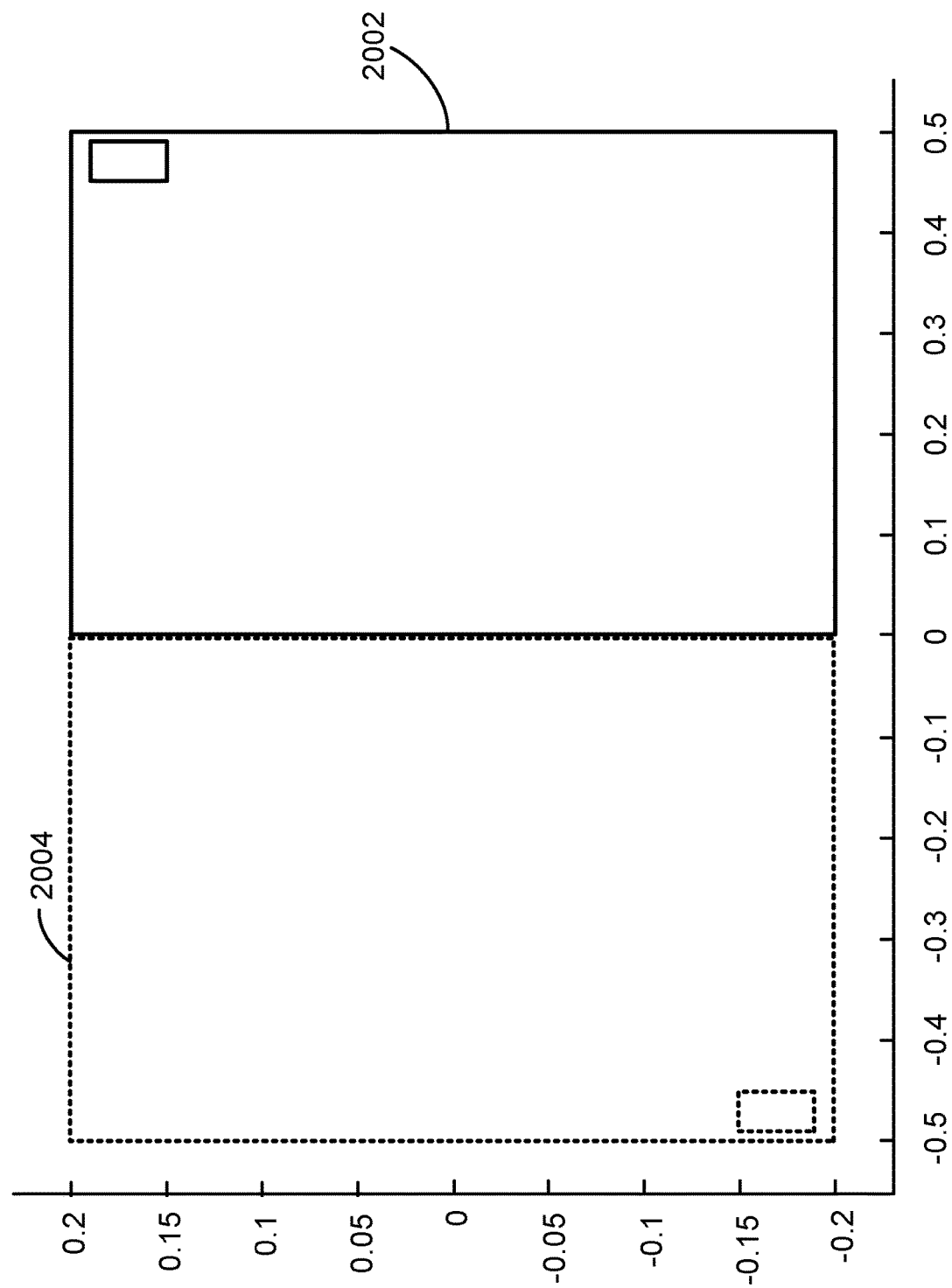
FIG. 20 illustrates the imaging of two rectangles by a waveguide according to some embodiments. The rectangle on the right represents the display side, and the rectangle on the left represents the image output of the system.

FIG. 20 illustrates the imaging of two rectangles by a waveguide according to some embodiments. The rectangle on the right 2002 represents the display side, and the rectangle on the left represents the image output of the system.

Figure 21:
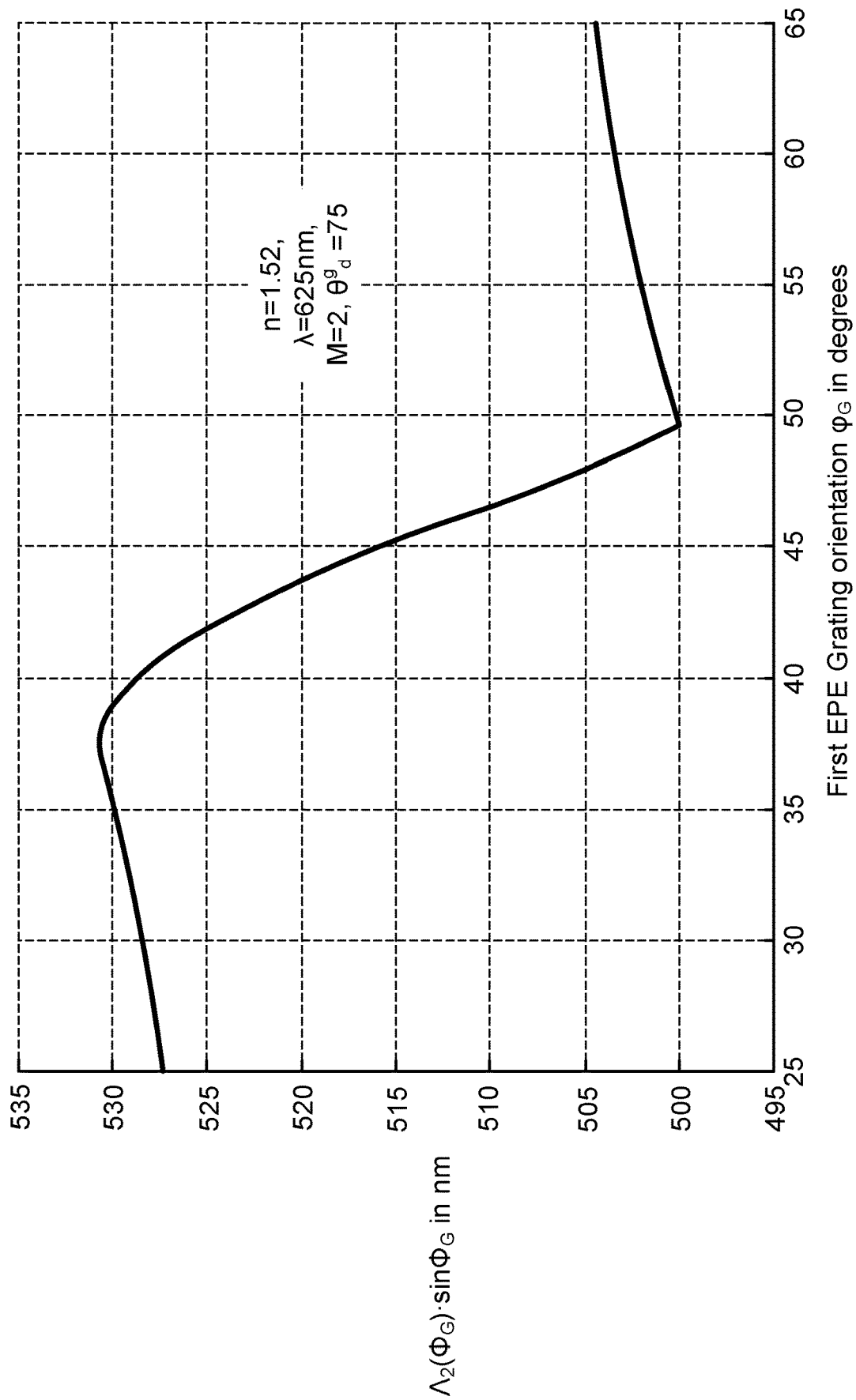
FIG. 21 is a graph illustrating variation of $\Lambda_2$ ($\Phi_G$) sin ($\Phi_G$) for different values of $\Phi_G$.

In selecting the pitch and orientation of gratings in a waveguide display, it is desirable to consider limits on the parameters. FIG. 21 is a graph illustrating the product of $\Lambda_2$ (as a function of $\Phi_G$) and sin($\Phi_G$) for different values of $\Phi_G$. The graph of FIG. 21 has a maximum at $\Lambda_2^{MAX} = 872.21$ nm and an angle of $\Phi_G=37.48°$. The minimum is at $\Lambda_2^{MIN}=656.64$ nm and an angle of $\Phi_G=49.59°$.

These values may be different for different values of the refractive index of the waveguide and the grazing angle inside of the waveguide. The pitch sizes vary linearly with the diffraction order. Then, depending on the amount of overlap between portions of the field of view coupled to the left and portions coupled to the right, which may lead to changes in $\Lambda_1$, the range for $\Lambda_4$ may be determined using the equations above. In the case of a system without overlap, and using only the second diffractive order, a $\Lambda_4$ value may be selected between 1211 nm and 1409 nm.

In an overview of an example embodiment, an incoupler grating pitch $\Lambda_1$ is selected based on the field of view to be coupled into the waveguide. The orientation of a first eye pupil expander may be selected, for example to allow for an out coupler with a relatively smallest pitch size, which may help minimize stray light. In some embodiments, the first eye pupil expander may be oriented with an angle above 45 degrees, which may be desirable in embodiments in which the second eye pupil expander and the out-coupler are fused together to form one grating.

Once the orientation of the first eye pupil expander has been selected, the pitch $\Lambda_2$ of the first eye pupil expander may be selected to substantially maximize the field of view, or it may be selected based on other considerations. The pitch $\Lambda_2$ for the first eye pupil expander may, for example, be selected according to the graph of FIG. 17. The pitch size of the second eye pupil expander may then selected by solving the x-component of the distortion-free equation. The pitch size of the out coupler may be deduced using the y component of the same equation.

In example embodiments, the horizontal field of view may be enlarged (e.g. maximized) through selection of the pitch $\Lambda_1$ and diffractive order $M_1$ of the in-coupler, the vertical field of view may be enlarged (e.g. maximized) through selection of the pitch $\Lambda_2$ and diffractive order $M_2$ of the first eye pupil expander, and other parameters may be selected to avoid distortion according to one or both of the following relationships:

$$\Lambda_3 = \frac{M_3}{M_2}\Lambda_2\tan(\Phi_G)$$

$$\frac{M_4}{\Lambda_4} - \frac{M_1}{\Lambda_1} + \frac{M_2}{\Lambda_2\sin(\Phi_G)} = 0$$

Parameters selected according to embodiments described herein may depart from exact solutions to the equations provided for practical reasons (such as tolerances in the fabrication process) or other design considerations. In some embodiments, the grating pitches $\Lambda$ are selected within 5% of a value that satisfies the above equations. In some embodiments, the grating pitches $\Lambda$ are selected within 10% of a value that satisfies the above equations. In some embodiments, the angle $\Lambda$ is within 5° of a value that satisfies the above equations. In some embodiments, the angle $\Phi_G$ is within 10° of a value that satisfies the above equations. In some embodiments, the grating vectors $\vec{G}_2$ and $\vec{G}_3$ are not at angles that are precisely 90° apart. In some embodiments, the angle between $\vec{G}_2$ and $\vec{G}_3$ is between 85° and 95°. In some embodiments, the angle between $\vec{G}_2$ and $\vec{G}_3$ is between 80° and 100°.

In some embodiments, the diffraction grating of a waveguide are all on the same surface of the waveguide (e.g. all on the user-facing surface or all on the opposite surface). In various different embodiments, the diffraction gratings may be provided on different surfaces of the waveguide. For example, one or more of the gratings may be on a user-facing surface of the waveguide, while one or more of the other gratings may be on the opposite surface of the waveguide. In some embodiments, the waveguide gratings may overlap one another. Overlapping gratings may be on opposite sides of the waveguide, or they may at least partially overlap on the same surface of the waveguide. Overlapping gratings on the same surface may take on a cross-hatched form in the region of overlap.

In some embodiments, instead of using two eye pupil expanders for each half of the field of view, four polarization-selective eye pupil expanders may be used for each half of the field of view. For example, the left half of the field of view may use two eye pupil expanders configured for a first polarization state to process the upper-left quarter of the field of view and two eye pupil expanders configured for a second (e.g. orthogonal) polarization state to process the lower-left quarter of the field of view. A similar (e.g. symmetric) arrangement of polarization-sensitive eye pupil expanders may be used to process the upper-right and lower-right quarters of the field of view. In such embodiments, the eye pupil expanders associated with each quarter of the field of view may, as a group together with the in-coupler and out-coupler gratings, substantially satisfy the relationships described herein.

Example embodiments provide a wide field of view while also providing imaging with little to no distortion using a C-shape geometry for the diffraction gratings.

In the present disclosure, modifiers such as "first," "second," "third," and the like are sometimes used to distinguish different features. These modifiers are not meant to imply any particular order of operation or arrangement of components. Moreover, the terms "first," "second," "third," and the like may have different meanings in different embodiments. For example, a component that is the "first" component in one embodiment may be the "second" component in a different embodiment.

Although features and elements are described above in particular combinations, one of ordinary skill in the art will appreciate that each feature or element can be used alone or in any combination with the other features and elements.

What is claimed:

1. A waveguide apparatus comprising:
an in-coupler grating configured to use diffraction order $M_1$, the in-coupler grating having a first grating pitch $\Lambda_1$ and a first grating vector $\vec{G}_1$ substantially perpendicular to a first axis, $\hat{x}$;
a first eye pupil expander grating configured to use diffraction order $M_2$, the first eye pupil expander having a second grating pitch $\Lambda_2$ and second a grating vector $\vec{G}_2$ having a first angle $\Phi_G$ with respect to the first axis;
a second eye pupil expander grating configured to use diffraction order $M_3$, the second eye pupil expander having a third grating pitch $\Lambda_3$ and a third grating vector $\vec{G}_3$ having a second angle of between $80°+\Phi_G$ and $100°+\Phi_G$ with respect to the first axis; and
an out-coupler grating configured to use diffraction order $M_4$, the out-coupler grating having a fourth grating pitch $\Lambda_4$ and a fourth grating vector $\vec{G}_4$ substantially perpendicular to the first axis;

wherein the out-coupler grating is configured to use a first diffractive order, and at least one of the in-coupler grating and the eye pupil expander gratings is configured to use a second diffractive order; and wherein the third grating pitch $\Lambda_3$ of the second eye pupil expander substantially satisfies:

$$\Lambda_3 = \frac{M_3}{M_2} \Lambda_2 \tan(\Phi_G).$$

2. The apparatus of claim 1, wherein the second angle is between $85°+\Phi_G$ and $95°+\Phi_G$ with respect to the first axis.

3. The apparatus of claim 1, wherein the second angle is substantially equal to $90°+\Phi_G$ with respect to the first axis.

4. The apparatus of claim 1, wherein the out-coupler grating is configured to use a first diffractive order and the in-coupler grating and the first and second eye pupil expander gratings are configured to use a second diffractive order.

5. The apparatus of claim 1, wherein the fourth grating pitch $\Lambda_4$ of the out-coupler substantially satisfies:

$$\frac{M_4}{\Lambda_4} - \frac{M_1}{\Lambda_1} + \frac{M_2}{\Lambda_2 \sin(\Phi_G)} = 0.$$

6. The apparatus of claim 1, wherein the grating pitches $\Lambda_2$ and $\Lambda_3$ substantially satisfy:

$$\Lambda_2 = \Lambda_3 = M\lambda \sin\left(\Phi_G - \frac{\varphi}{2}\right)$$

where $$\varphi = \sin^{-1}\left(1 - \frac{1}{n_2 \sin\theta_2^g}\right),$$

$n_2$ is a refractive index of the waveguide, and $\theta_2^g$ is a grazing angle.

7. The apparatus of claim 1, wherein the grating pitch $\Lambda_1$ substantially satisfies:

$$\Lambda_1 = \frac{M_1 \lambda}{n_2 \sin\theta_1^g - n_1 \sin\theta_0^g}$$

where $\lambda$ is the wavelength of an incoming beam, $n_1$ is a refractive index of a medium in which the incoming beam is traveling, $\theta_1^g$ is a grazing angle, and $\theta_0^g$ is an angle of an incoming beam that diffracts to grazing angle $\theta_1^g$.

8. The apparatus of claim 1, wherein the grating pitches are within 20% of the following values:
$\Lambda_1$=851.38 nm
$\Lambda_2$=729.46 nm
$\Lambda_3$=729.46 nm
$\Lambda_4$=1308.64 nm.

9. The apparatus of claim 1, wherein the grating pitches are within 10% of the following values:
$\Lambda_1$=851.38 nm
$\Lambda_2$=729.46 nm
$\Lambda_3$=729.46 nm
$\Lambda_4$=1308.64 nm.

10. The apparatus of claim 1, wherein the following relationship is substantially satisfied:

$$\left(\frac{M_2}{\Lambda_2}\right)^2 + \left(\frac{M_3}{\Lambda_3}\right)^2 = \left(\frac{M_1}{\Lambda_1} - \frac{M_4}{\Lambda_4}\right)^2.$$

11. The apparatus of claim 1, wherein the following relationships are substantially satisfied:

$$\frac{1}{2}\left(\cos^{-1}\left(\frac{N}{\sqrt{2}}\right) + 45°\right) < \phi_K \le 90°$$

where $N=1/n_2 \sin\theta_2^g$, and $\Phi_K=90°-\Phi_G$, and $$\Lambda_2 = \frac{M_2 \lambda}{2 \times \cos(\phi_K - \Delta\phi/2)} \text{ where}$$

$$\Delta\phi = 2\cos^{-1}\left(\sqrt{\frac{(N+1)^2(\tan\phi_K)^2}{(1-N)^2 + (N+1)^2(\tan\phi_K)^2}}\right).$$

12. The apparatus of claim 1, wherein the following relationships are substantially satisfied:

$$\frac{1}{2}\left(\cos^{-1}\left(\frac{N}{2\sin\tan^{-1}N}\right) + \tan^{-1}N\right) < \phi_K \le \frac{1}{2}\left(\cos^{-1}\left(\frac{N}{\sqrt{2}}\right) + 45°\right) \text{ and}$$

$\Lambda_2 = M_2 \lambda \sin(\phi_K - \Delta\phi/2)$ where $\Delta\phi = \sin^{-1}(\sin(2\phi_K) - N)).$ 13. The apparatus of claim 1, wherein the following relationships are substantially satisfied:

$$\frac{1}{2}\left(\cos^{-1}\left(\frac{N+2-N^2}{2\sqrt{N+1}}\right) + \sin^{-1}\sqrt{\frac{3-N}{4}}\right) <$$

$$\phi_K \le \frac{1}{2}\left(\cos^{-1}\left(\frac{N}{2\sin\tan^{-1}N}\right) + \tan^{-1}N\right)$$

and $$\Lambda_2 = \frac{N M_2 \lambda}{2 \times \cos(\phi_K - \Delta\phi/2)} \text{ where}$$

$$\Delta\phi = 2\tan^{-1}\left[\frac{\cos\phi_K - \sqrt{\Delta}}{2(\alpha + \sin\phi_K)}\right], \text{ with}$$

$$\alpha = \frac{1-N^2}{8 \times \sin\phi_K} \text{ and}$$

$$\Delta = (\cos\phi_K)^2 - 4\alpha(\alpha + \sin\phi_K).$$

14. The apparatus of claim 1, wherein the following relationships are substantially satisfied:

$$\phi_K \le \frac{1}{2}\left(\cos^{-1}\left(\frac{N+2-N^2}{2\sqrt{N+1}}\right) + \sin^{-1}\sqrt{\frac{3-N}{4}}\right) \text{ and}$$

-continued $$\Lambda_2 = \frac{NM_2\lambda}{\cos(\phi_K - \Delta\phi/2) + \sqrt{N^2 - (\sin(\phi_K - \Delta\phi/2))^2}} \text{ where}$$

$$\Delta\phi = 2\cos^{-1}\left[\frac{\sqrt{1+\cos(2\phi_K)}}{\sqrt{2} \times \cos(2\phi_K)}\right].$$

15. The apparatus of claim 1, further comprising an image generator configured to generate an image, the in-coupler grating being configured to couple the image along at least one optical path to the out-coupler grating.

16. A method comprising:
coupling light into a waveguide using an in-coupler grating configured to use diffraction order $M_1$, the in-coupler grating having a first grating pitch $\Lambda_1$ and a first grating vector $\vec{G}_1$ substantially perpendicular to a first axis, $\hat{x}$;
diffracting the light with a first eye pupil expander grating configured to use diffraction order $M_2$, the first eye pupil expander having a second grating pitch $\Lambda_2$ and second a grating vector $\vec{G}_2$ having a first angle $\Phi_G$ with respect to the first axis;
diffracting the light with a second eye pupil expander grating configured to use diffraction order $M_3$, the second eye pupil expander having a third grating pitch $\Lambda_3$ and a third grating vector $\vec{G}_3$ having a second angle of between 80°+$\Phi_G$ and 100°+$\Phi_G$ with respect to the first axis; and
coupling the light out of the waveguide using an out-coupler grating configured to use diffraction order $M_4$, the out-coupler grating having a fourth grating pitch $\Lambda_4$ and a fourth grating vector $\vec{G}_4$ substantially perpendicular to the first axis;
wherein the out-coupler grating is configured to use a first diffractive order, and at least one of the in-coupler grating and the eye pupil expander gratings is configured to use a second diffractive order; and
wherein the third grating pitch $\Lambda_3$ of the second eye pupil expander substantially satisfies:

$$\Lambda_3 = \frac{M_3}{M_2}\Lambda_2 \tan(\Phi_G).$$

17. The method of claim 16, wherein the second angle is between 85°+$\Phi_G$ and 95°+$\Phi_G$ with respect to the first axis.

18. The method of claim 16, wherein the out-coupler grating is configured to use a first diffractive order, and at least one of the in-coupler grating and the eye pupil expander gratings is configured to use a second diffractive order.

19. The method of claim 16, wherein the second angle is substantially equal to 90°+$\Phi_G$ with respect to the first axis.

* * * * *